US006928148B2

(12) United States Patent
Simon et al.

(10) Patent No.: US 6,928,148 B2
(45) Date of Patent: Aug. 9, 2005

(54) INTEGRATED SECURITY AND COMMUNICATIONS SYSTEM WITH SECURE COMMUNICATIONS LINK

(75) Inventors: Theodore Simon, Dix Hills, NY (US); Steven Winick, Woodmere, NY (US); Scott H. Simon, Huntington, NY (US); Christopher E. Beach, Amityville, NY (US)

(73) Assignee: Pittway Corporation, Syosset, NY (US)

( * ) Notice: Subject to any disclaimer, the term of this patent is extended or adjusted under 35 U.S.C. 154(b) by 435 days.

(21) Appl. No.: 09/805,864

(22) Filed: Mar. 13, 2001

(65) Prior Publication Data

US 2001/0050976 A1 Dec. 13, 2001

Related U.S. Application Data

(60) Provisional application No. 60/188,798, filed on Mar. 13, 2000.

(51) Int. Cl.[7] .............................................. H04M 11/00

(52) U.S. Cl. .................... 379/39; 379/90.01; 379/93.24; 379/93.02

(58) Field of Search .............................. 379/37, 38, 39, 379/40, 45, 93.24, 90.01, 106.01

(56) References Cited

U.S. PATENT DOCUMENTS

| | | | | |
|---|---|---|---|---|
| 4,409,590 A | | 10/1983 | Baker | 340/553 |
| 4,937,855 A | | 6/1990 | McNab et al. | 379/103 |
| 5,195,126 A | | 3/1993 | Carrier et al. | 379/45 |
| 5,440,625 A | | 8/1995 | Akiyama | 379/216 |
| 5,604,791 A | | 2/1997 | Lee | 379/67 |
| 5,940,474 A | | 8/1999 | Ruus | 379/49 |
| 5,986,571 A | | 11/1999 | Flick | 340/825.72 |
| 6,430,268 B1 | * | 8/2002 | Petite | 379/39 |
| 6,442,241 B1 | * | 8/2002 | Tsumpes | 379/45 |
| 2003/0195982 A1 | * | 10/2003 | Motoyama et al. | 709/238 |

FOREIGN PATENT DOCUMENTS

| | | |
|---|---|---|
| GB | 2309364 | 7/1997 |
| GB | 2 325 548 | 11/1998 |
| HU | 212356 | 7/1993 |
| HU | 216856 | 12/1997 |
| WO | WO95/01041 | 1/1995 |
| WO | WO97/48220 | 12/1997 |
| WO | WO99/39505 | 5/1999 |
| WO | WO99/46923 | 9/1999 |

OTHER PUBLICATIONS

Idermark, T., et al., Ericsson's e–box system—An electronic services enabler, *Ericsson Review No. 1*, pp. 38–44 (1999).

Moore, M.A., "Integrated Alarm System and Cordless Phone," *Motorola Technical Developments*, vol. 11, pp. 82–85 (Oct. 1990).

* cited by examiner

*Primary Examiner*—Stella Woo
(74) *Attorney, Agent, or Firm*—Fish & Neave IP Group of Ropes & Gray LLP; Jeffrey H. Ingerman

(57) ABSTRACT

An integrated security and communications system combines a security system to either or both of a telephone system interface and a data interface. Users have access to voice-mail or other PBX-type telephone functions, many or all of which can be accessed not only at telephone sets, but also at keypads of the security system. Data functions such as electronic mail and possible partial or full World Wide Web access may also be provided at the keypads, as well as at connected personal computers or computer terminals. The system keypads may be enhanced to better accommodate some of the added functions. A central communications station could be used to maintain secure, shared private key encrypted communications with each premises system, using a redirector arrangement or relay to allow each premises system to communicate securely with a central monitoring station and with other systems. The secure communications system could be used without a security system to allow secure computer-to-computer communications.

117 Claims, 8 Drawing Sheets

INTEGRATED SECURITY AND COMMUNICATIONS SYSTEM WITH SECURE COMMUNICATIONS LINK

CROSS REFERENCE TO RELATED APPLICATION

This claims the benefit of U.S. Provisional Patent Application No. 60/188,798, filed Mar. 13, 2000, now abandoned.

BACKGROUND OF THE INVENTION

This invention relates to an integrated security and communications system. In particular, this invention relates to a security system integrated with a telephone system and/or an Internet connection, in which various communications features can be accessed from a keypad of the security system, and various security system features can be accessed from connected telephone sets.

Security systems for residential properties are well known. Such systems at one time were electrical or electromechanical in nature, but in more recent times have become electronic in nature, relying on microprocessors for controlling and carrying out their functions. Moreover, while it was common at one time for a residential security system to have external controls (e.g., key-operated switches) to activate and deactivate the system on exit and entry, which provided a point of attack for potential intruders, it is more common now for a microprocessor-based system to provide entry and exit delays, allowing all control interfaces to be within the protected perimeter of the premises. As a result, the first place a returning occupant goes upon entering the residence is to the nearest control interface for the security system, to disarm the system before expiration of the entry delay. Similarly, the last place a departing occupant goes upon leaving the premises is to the control interface, to arm the system.

Alternatively, or additionally, the user may have a transmitter, frequently provided in the form of a keyfob to be kept on the user's keyring, for arming and disarming the system. The transmitter may be a radio-frequency transmitter, in which case the user would not necessarily have to be within close proximity to any particular location on the premises, or may be an infrared transmitter, in which case the user would have to be in close proximity to, or at least substantially in the line of sight of, a receiver, which might conveniently be included as part of the control interface.

It also has become common for residences to be equipped with some sort of telephone answering device, which records a caller's incoming message, name, and or telephone number, for playback or review by the resident upon returning home. The answering machine or caller identification device also is one of the first places to which a resident goes on returning home.

Most recently, it also has become common for individuals to have electronic mail accounts for receiving messages via the Internet or other public data networks. Thus, a third place to which a returning resident goes is to a computer, to retrieve the electronic mail.

Security systems of the type being discussed almost universally communicate with a "central station" which monitors or supervises the status of each security system. Not only are alarms reported to the central station, which then acts on them or dispatches law enforcement to act on them, but even the absence of communication may be acted upon as a sign of possible trouble at the secured premises. In addition, a maintenance condition (such as a low back-up battery) can be detected and a service technician can be dispatched or the premises owner can be advised to correct the condition.

The communications between the local security system and the remote central station has traditionally been carried by landline or cellular telephone or by radio. Frequently, more than one of those media are used, for redundancy. Increasingly, many of the protected premises, including both homes and businesses, have high-speed connections to the Internet. Using such connections to communicate to the central station would be faster than the other methods described above. However, there are several problems associated with using the Internet for central station communications.

First, the inherent nature of the Internet gives rise to the risk of interception of, or eavesdropping on, messages sent on the Internet. This means that a secure encryption method is required.

Second, most Internet connections do not have fixed Internet Protocol ("IP") addresses, meaning the central station cannot be sure, simply from looking at the originating address, that a message comes from a particular location. Because the central station must therefore accept messages from any IP address, and use other data in the message to identify the sender, the central station needs some other way to authenticate that the sender is who it appears to be.

Third, in most cases where the premises is served by an Internet connection, that connection is protected by a "firewall" to prevent unauthorized access to computers on the premises—e.g., by "hackers." This makes it difficult, if not impossible, for a central station to poll the security system on the premises via the Internet, because the firewall prevents Internet access from the outside.

Fourth, the Internet has not yet reached a sufficiently mature state that it can be counted on to be available at all times. Service to a particular location may be "down" at unpredictable times.

Nevertheless, if a way could be found to use the Internet to communicate securely between a premises security system and a central station, and the system worked—i.e., the connection was not "down," the Internet would clearly be the fastest communications channel, as compared to landline or cellular telephone, or radio.

Such a system would have multiple channels available to get messages to the central station. It would be necessary to use those various channels in the most efficient manner, avoiding unnecessary redundancy but also avoiding unnecessary delay in reporting to the central station.

It would be desirable to be able to minimize the number of electronic devices to which an individual must attend on returning or leaving the premises.

It also would be desirable to be able to improve the security of communications between the premises and an external data network.

SUMMARY OF THE INVENTION

It is an object of this invention to minimize the number of electronic devices to which an individual must attend on returning or leaving home.

It is also an object of this invention to improve the security of communications between the home and an external data network.

In accordance with this invention, there is provided an integrated security and communications system. The system has a security controller having at least one sensory input, at least one alarm output and at least one control signal input/output port. A control interface is operatively connected to the control inputs and outputs. A communications unit is connected to a communication channel providing at least one communication function, and has a first communication port for connection to a control input and a control output of the security controller for providing at least one of its communication functions to a user at the control interface.

In one embodiment of the invention, the communications unit is an electronic answering machine/voice-mail unit, providing an array of telephone answering and related functions. In another embodiment, the communications unit is an Internet gateway. In a particularly preferred embodiment, the Internet gateway can communicate with the Internet securely from behind a firewall using shared private key encryption, creating a virtual private network.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
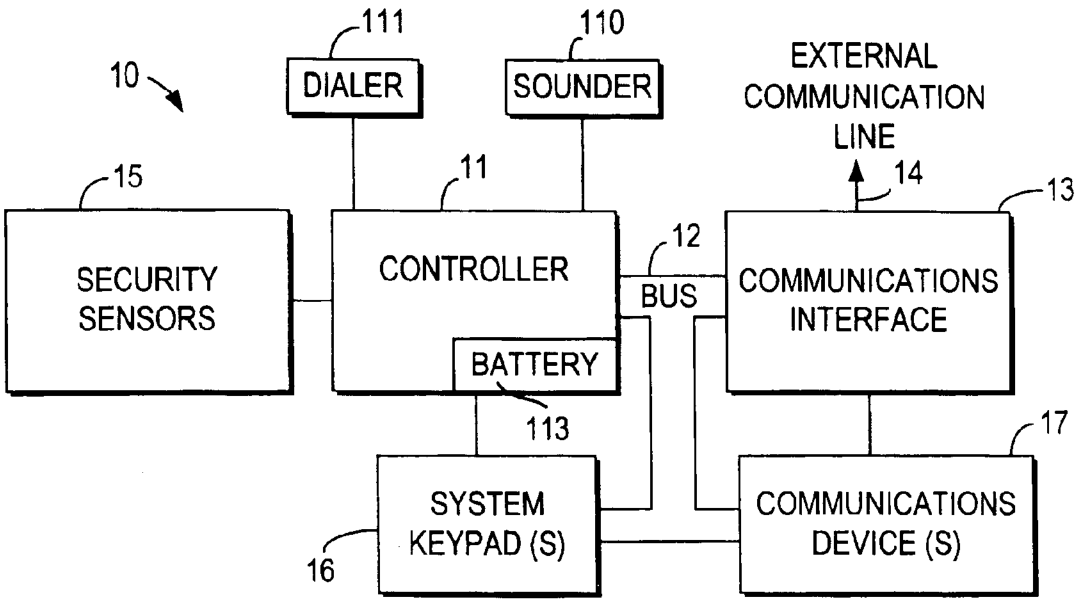
FIG. 1 is a simplified schematic diagram of a preferred embodiment of a security system in accordance with the present invention.

The present invention recognizes that the first place a user must go on entering a residence or other premises protected by a security system is to the security system keypad, to disarm the system (or place it in an "armed home" state) prior to the expiration of the entry delay period. The invention also recognizes that the last place a user goes before leaving the premises is to the security system keypad, to arm the system prior to leaving. In accordance with the invention, communication functions, such as telephone answering or voice-mail functions, or Internet or other public data network functions, such as electronic mail, are made available to the user at the security system keypad. Depending on the number of functions provided, and the level of functionality provided for each function, it may be possible to use a conventional keypad, or an enhanced keypad may be required, as described in more detail below.

In order for the communications functions to be available at the keypad, the security system has to be integrated to at least some degree with the communications system or systems involved. While security systems ordinarily are connected to a telephone line—e.g., for central station monitoring—or to a radio-frequency or cellular communications device, greater integration than that normally provided is foreseen by the present invention.

In one preferred embodiment of the invention, an electronic answering machine or voice-mail unit is integrated into the security system and connected—by wired or wireless connection—to the household telephone line. If the household has a separate telephone line for security system monitoring, then the telephone line used for voice calls must be connected to the integrated voice-mail unit. In this system, the voice mail functions preferably are available at at least one, and preferably all, keypads of the security system.

In order to operate the voice mail functions, the security keypad preferably has at least eleven buttons, for the digits 0-9 plus one function key such as "#", and preferably a twelfth key such as "*", to mimic a standard DTMF telephone keypad. In addition, the keypad preferably has a speaker to play back any voice messages recorded by the system. Most conventional keypads already have a speaker for the purpose, e.g., of sounding a "pre-alarm" warning during the entry delay period (as a reminder that the system must be disarmed). It would also be desirable for the keypad to have a visual indicator that could be used for indicating the presence of messages to be played. However, this is not essential, as the system could be configured to announce aurally, on disarming of the system, whether or not there are messages, and if so how many. The user then uses keypad commands to play back the messages, delete them, archive them, etc. The system could also provide an audible indication on any connected telephone sets—such as a repeating beep heard on top of the dial tone—so that if a user picks up any such telephone set, it will be apparent that messages are present. The user could then use the telephone keypad to play the messages, etc.

It is known in voice-mail and telephone answering systems to provide multiple voice mailboxes, to which messages for different members of the household can be directed. It is also known to provide different security system user passcodes to different members of the household. In one embodiment of an integrated security and voice-mail system according to the invention, where individual voice mailboxes are provided, the entry of a particular passcode associated with a particular user, to perform any system function, also causes the system to play back, or at least announce the existence of, messages from that user's voice mailbox, or alternatively, from that user's voice mailbox and from a general mailbox, if there is one, but not from any other user's mailbox. In systems where users are provided, for control of the security functions, with swipe cards or transmitters that typically are coded differently for different individuals, then the use of such a card or transmitter or other coded token associated with a particular individual preferably has the same result as entry of an individual passcode. If the system has only one general mailbox, then any user's code would cause playback, or announcement of the existence, of the general mailbox messages.

Another voice-mail function, commonly provided in stand-alone answering machines, that could be provided by the system according to the invention, is the ability of one user to record a voice memo for another user. For example, a parent could record a reminder for a child to do his or her homework. When the child arrives at home and disarms the security system, the integrated voice-mail system would recognize the child's passcode and play back, or announce the existence of, the voice memo, along with any voice messages in the child's mailbox.

The voice-mail functionality of the system is preferably provided by a telephone interface module connected to the security system control unit and to the telephone line to be answered. Among other advantages, this allows the telephone interface module to be backed up by the security system back-up battery, preserving settings, recorded greetings, and recorded incoming messages in the event of an AC power failure. Although known answering machines have battery back-up, integration with the security system means that the back-up battery is monitored by the central station, so that if it is low, a warning will be issued or a technician sent to replace the battery, as discussed above. The system may be designed so that when it is operating on back-up power, it selectively sheds certain loads. For example, the system could turn off answering system functions or portions thereof such as the digital signal processor whenever the system is on battery power, or only if the battery voltage drops below a minimum DC threshold voltage required to preserve security functions.

The telephone interface module can be connected in parallel with the premises telephone wiring, but preferably is connected in series with the premises telephone wiring—i.e., the incoming telephone line is connected to the telephone interface module, which in turn is connected to the premises telephone wiring. This would allow the voice-mail functions to be accessed from any telephone set on the premises, in addition to being accessed from the security system keypads. In addition, it would allow security system functions to be accessed from the telephone sets as well. Alternatively, in another embodiment, if the telephone interface module continually monitors the telephone line for DTMF activity, it could be connected in parallel with the premises telephone wiring and nevertheless allow the telephone sets to access either or both of voice-mail and security system functions. In still another embodiment, some of the telephone sets on the premises are connected to the telephone interface module while others are connected to the premises telephone wiring in parallel with the telephone interface module.

It should be noted that the integration of security system and telephone interface functions, such as the playback or announcement of the existence of voice messages upon disarming of the security system, requires that the passcodes for the security system and the telephone interface unit be the same. This is particularly the case if personalized mailboxes are provided, which is necessary if personalized recorded memos are to be provided, but is also necessary if the system is simply to record messages in a single mailbox and play them back. If the passcodes for the two systems are not the same, disarming of the security system will not cause playback or announcement of voice messages. The user still will be able to access the telephone interface system from the security system interface by entering appropriate separate commands, but he or she would have to remember to do so. In a preferred embodiment, however, the passcodes for the two systems are required to be identical, so that the systems function in the fully integrated manner described above.

In an embodiment of the invention where all telephone sets on the premises are connected through the telephone interface module, a privacy feature can be provided. This feature preferably can be activated from any telephone set using a particular DTMF sequence or a key provided for that purpose, and preferably also from any security system keypad using the numeric keys or a key provided for that purpose. When active, the privacy feature disables the ringers in all telephone sets, or blocks the transmission of a ring signal to the telephone sets. This means that incoming calls will not be answered and will be routed to the telephone answering system. The outgoing message will include an indication that the privacy feature is on. This will allow any knowledgeable caller, such as a member of the household, to enter a DTMF sequence to allow him- or herself to broadcast a message over the speakers of security system keypads, so that other members of the household, who have engaged the privacy mode, will know to answer the call. The privacy mode can be deactivated by entering the appropriate sequence from any connected telephone set or security system keypad. However, as a failsafe, the privacy feature preferably deactivates itself after a predetermined duration—e.g., eight hours. In addition, the system could be set up to allow the user, when invoking the privacy feature, to set the duration that the feature will remain active.

Another feature that can be provided if at least some telephone lines on the premises are connected to the telephone interface unit rather than directly to the telephone provider central office, and a personal computer on the premises is connected, via a modem, to one such telephone line, is embodied in software that can be provided on the personal computer. The software causes the personal computer to send a particular series of DTMF tones or other signalling to the telephone interface unit, causing the telephone interface unit to disconnect from the central office telephone line and enter a programming/maintenance mode. In this mode, the personal computer can be used to inspect and reprogram settings of the telephone interface unit. Preferably, this is done by downloading a configuration file from the telephone interface unit to the personal computer, changing the configuration file, and uploading the new configuration to the telephone interface unit. In addition, audio files preferably can be transmitted between the personal computer and the telephone interface unit, allowing incoming voice mail messages to be downloaded to the personal computer, and also allowing the user to compose the outgoing message and other custom voice prompts or tags on the personal computer and then upload them to the telephone interface unit.

As in the case of many known telephone answering or voice-mail systems, the voice-mail functionality provided by the telephone interface module according to the invention preferably is remotely accessible by dialing into the system from an external telephone. Moreover, because the telephone interface module is connected to the security system controller, then preferably security system functions are accessible as well, whether dialing in from an external telephone, or picking up a premises telephone set.

Other functions offered by private-branch exchange ("PBX") telephone systems could be offered to connected telephone sets by the system according to the invention. For example, memory dialing ("speed dialing") of some quantity of stored telephone numbers preferably is provided. In addition, in an alternative embodiment in which the security system keypads are equipped with microphones, they could operate as additional telephone extensions, functioning as speakerphones. Even if the keypads do not have microphones, they could be used as extensions for listening only—e.g., to call recorded announcements or interactive voice-response systems.

Another function that the system preferably provides at either connected telephone sets, keypads or both, is call screening—i.e., the ability to listen to an incoming caller leaving a message, to be able to determine whether or not to pick up the call. Call screening is a common feature of stand-alone answering machines, but is less common in a PBX/voice-mail configuration. However, according to the invention, by pressing an appropriate command, at a system keypad or on the keypad of a connected telephone set, while a message is being left, the message can be screened. And because a microphone is not needed for call screening, the screening function preferably is provided even at a keypad without a microphone. Further, in accordance with the invention, a call being screened preferably can be answered by entering an appropriate command. This would have to be at a telephone set or, if provided, at a keypad with a microphone. Preferably, the command to answer the call being screened, at least at a telephone set, is a flash of the telephone set hookswitch.

In a particularly preferred embodiment, the call screening feature is full-duplex—i.e., the caller's voice can be heard over the system speakers even while the outgoing message or greeting is being played. Therefore, a caller who is aware of this feature, such as a member of the household, can announce him- or herself during the outgoing message in an attempt to cause a household member who may be at home to pick up the call. This differs from previously known answering machines—whether digital or tape-based—in that in those previously known machines, the caller's voice could be heard only after playback of the outgoing message was complete and recording of the incoming message had begun.

Another feature normally associated with telephone answering machines that can be provided in accordance with an embodiment of the present invention is the so-called "toll saver" feature. In accordance with such a feature, the answering system waits a first number of rings before answering an incoming call if no messages have already been recorded, but waits only a second, smaller number of rings if at least one message has already been recorded. This allows the residents, if they are away—e.g., on vacation or holiday—to determine when calling from a remote location whether or not there are any messages waiting, without necessarily completing a telephone call to the system. If the system rings more than the smaller number of rings, they know that there are no messages, allowing them to hang up the call before the system answers, and thereby saving long-distance toll charges. In a further embodiment, the "toll-saver" feature is selectable—i.e., the user can control whether it is engaged at all—and adjustable—i.e., the number of rings the system will wait before answering can be chosen by the user. User control of the "toll-saver" feature preferably is available at least at a system keypad, and preferably at connected telephone sets as well. More preferably, control of the "toll-saver" feature also is available when calling in to the system from a remote location.

In addition, operation of the "toll-saver" feature preferably can be programmed to be dependent on the state of the system, so that, e.g., it is inactive when the system is in a disarmed or armed-home state which means that the premises are occupied. This gives the residents or occupants more time to get to a telephone, or keypad if appropriate, when there is an incoming call and messages have been recorded.

Another feature that can be provided in accordance with an embodiment of the present invention is calling party identification, more commonly known as "Caller ID," in which the telephone carrier sends, with each incoming telephone call, calling party identification data which can be decoded and displayed by equipment at the receiving end. In an embodiment of the present invention, the telephone interface unit can include a calling party identification decoder, allowing the calling party identification data to be displayed at, in addition to the specialized Caller ID equipment, those keypads that have alphanumeric displays—e.g., liquid crystal, gas plasma or light-emitting diode displays—and on specially-equipped telephone sets connected to the telephone interface unit. In addition, using speech synthesis technology, the calling party identification data can be added to a recorded message left by a caller, for playback along with the message from any on-premises or off-premises location. Similarly, speech synthesis technology can be used to announce the calling party identification data aurally (e.g., over keypad speakers). In a further embodiment, the system can store textual identifying data—e.g., names—in association with certain telephone numbers, and can announce, either visually, or aurally using speech synthesis, the name associated with a telephone number identified by the calling party identification data for each incoming call, either instead of or in addition to the number itself. Instead of using speech synthesis, the user could store a "voice tag" recorded by the user—e.g., "Mom's calling"—in association with certain numbers, and the voice tag could be played back. In a still further embodiment, the system could store, in association with certain telephone numbers, instructions for paging the user when a call is received from one of those numbers. When such a call is received, the system would dial the number of the pager stored in the instructions, and preferably may send, as a paging message, the calling number, most preferably with some indication that the page is coming from the home system as opposed to directly from the calling number. Alternatively, the system could send as the paging message a message that one of the stored numbers has called, allowing the user to call home for the voice mail message left by the caller.

Similarly, when "memory dialing" or "speed dialing" as discussed above is offered, the system could announce the number being called using speech synthesis, or could play back a stored voice tag stored with the memory-dial number.

In another embodiment of the invention, the use of calling party identification technology also allows the provision of distinctive ringing—i.e., a feature whereby calls from certain predetermined telephone numbers ring differently from ordinary calls, to alert those on the premises that a particular party is calling. A number of different distinctive ringing patterns could be provided, each of which can be assigned to one particular predetermined number, or to a group of numbers. Thus, particular friends or relatives could be assigned their own ringing signal, or a certain group of acquaintances—e.g., all co-workers—could be assigned a common ringing signal.

While the distinctive ringing feature could be provided by including a ring generator in the telephone interface unit, in a more particularly preferred embodiment, the distinctive ringing is provided by interrupting, in a predetermined manner, the incoming ringing signal provided by the telephone service provider. While this may limit the number of different ringing signals that could be provided, it avoids the need to generate, within the telephone interface unit, a 90 VAC ringing signal as is commonly used in telephones.

In a further embodiment that relies on calling party identification data, more than one outgoing greeting can be provided for each voice mailbox, with certain callers hearing a different greeting, as determined by the calling party identification data.

In another embodiment of the invention, the telephone interface unit provides an auto-redial feature. When a user makes a telephone call, if the called number is busy, the telephone interface unit will continue to call the called number at predetermined intervals until it detects a ringing signal. When a ringing signal is detected, an indication is made at the user premises, either by ringing the telephones, providing a visual indication on a telephone equipped with a visual indicator, or providing an aural or visual indication at a one or more system keypads, or any combination. If a user does not pick up a telephone within a predetermined interval after the indication is made, the system will disconnect the call. The user has the option of terminating the redial feature, which in any event is preferably limited in duration after the initial busy signal is detected—e.g., the system may attempt to redial the call every two minutes but only for half an hour after the initial busy signal.

Another feature that is provided in a preferred embodiment of the invention is a public address feature. A user can pick up a telephone set connected to the telephone interface unit and, by issuing an appropriate command, either on the telephone keypad or on a specially-provided button, disconnect the telephone set from the central office line and connect it to the speakers in the system keypads for broadcast of an announcement. Alternatively, individual keypads, or groups of keypads, could be addressed by telephone keypad commands. In a variant of this feature, another user, on hearing the announcement, can pick up another telephone set and, upon entering an appropriate command, be connected to the first user in an "intercom" mode, disconnected from the central office telephone line. The intercom or public address mode preferably is also available when the telephone line is in use. Specifically, if a user answers an incoming call, but the call is for another user on the premises, the user who answered the call could engage the public address or intercom function to advise the user for whom the call is intended. In such a case, while the telephone sets would be temporarily disconnected from the central office telephone line, the telephone interface unit would maintain the telephone line in an off-hook condition (i.e., "on hold") until one of the users is ready to pick up the all. Of course, these features would not be available from a telephone set that is connected to the central office telephone line directly rather than through the telephone interface unit.

In addition to providing a public address function, the telephone interface unit could also provide a room-monitoring function. Specifically, the system would allow a user to issue a command on any connected telephone set to monitor the microphone of any microphone-equipped keypad on the system. Preferably, the appropriate command could also be issued from any other keypad, as long as the other keypad has a speaker for listening, whether or not it has a microphone. This feature could be used, for example, to monitor a baby's room.

In another alternative embodiment of the invention, instead of providing voice-mail functionality in the telephone interface unit, the user could subscribe to central office voice-mail service from the telephone company. Normally, a subscriber to that service is informed of waiting messages by a special dial tone that is audible only when a telephone set is picked up. In this embodiment of the invention, the telephone interface unit senses the presence of the special dial tone and causes an aural or visual indication at one or more system keypads, and, in a further alternative, visually on specially equipped telephone sets connected to the telephone interface unit. In addition, the system could, upon command from a keypad, connected telephone set, or other connected communications device, or upon disarming of the security system, dial out on the central office telephone line the DTMF digits, including the user's access code, necessary to accessing the voice mail service (or other functions) provided by the central office, playing back the messages at the device from which the command was entered.

The system according to the invention is capable of sending an off-hook signal to the telephone company central office even when no telephone set is in an off-hook condition. This allows the system to provide a "hold" feature. A user can command the system to put a call on hold—i.e., disconnecting it from the premises telephone sets but keeping the central office telephone line in an off-hook condition, by, e.g., entering a DTMF command or flashing the hookswitch.

Many of the features described above are provided by having the telephone interface unit monitor incoming telephone calls on connected telephone sets and even on unconnected telephone sets. That same monitoring capability can be used to monitor outgoing telephone calls, and in accordance with another feature of the invention, the system can keep a log of outgoing calls including such information as number called, time of call, duration of call, etc. This information preferably can be displayed on the display of a telephone set so equipped or on the display of a security keypad so equipped. Moreover, the system could then be used to block certain telephone calls, such as those to "900" numbers, or to specific numbers programmed into the system, or even long distance calls. As a further feature, such calls could be unblocked by entering an appropriate code. Of course, to use these blocking features, the telephone sets would have to be connected through the telephone interface unit; telephone sets connected directly to the central office line in parallel with the telephone interface unit would have unlimited access to the telephone line. Thus, a user interested in these features typically would not have any telephone sets that are not connected through the telephone interface unit.

In addition to, or instead of, being connected to a telephone line, the security system according to the present invention can be connected to an external data network for sending or receiving data. One example of such a network to which the system can be connected is the Internet. Preferably, if the system is connected to an external data network such as the Internet, the connection is of the type which is always on and active. The external data network may used as a backup channel for communication with the central station that monitors the security system, with a traditional dial-up or cellular telephone connection or radio-frequency communication channel as the primary channel, but the external data network also could be used as the primary central station monitoring channel, with the traditional communications methods used as back-up. Either way, preferably the various channels are used redundantly to make sure that the message gets to the central station. More preferably, once transmission on one channel succeeds, incomplete attempts using other channels are terminated, as described in more detail below.

In accordance with another aspect of the present invention, an Internet connection between the premises and the central station can be used for reliable secure communications. Both of the problems of security and authentication are solved by using shared private key encryption. Each premises system is provided with a unique private key. For example, in a preferred embodiment, the private key is built into the system controller at the time of manufacture. The same private key is shared with the central station. The central station thus stores many private keys, one for each of the units it monitors. If the central station is communicating with a particular unit, if it is able to decrypt the communication with that unit using the private key that it associates with that unit, which no one else in the world is supposed to know, then the central station knows two things. First, the central station knows that the unit is the unit that the central station thinks it is, because if it were a different unit, the private key would not function to decrypt the communication. Second, by virtue of the same private key encryption, the central station knows that the communication was secure.

The remaining problem of the premises firewall is solved by having the premises unit initiate contact with the central station periodically. Most firewalls do not prevent sessions that initiate within the firewall. Once a session is open, the central station can send any messages or other data to the premises unit. If the central station does not hear from the premises unit at the appointed intervals, it assumes a problem and dispatches someone to the premises. Otherwise, the contact intervals are set to be short enough that the central station is not likely to have too much of a build-up of unsent messages to the premises. The contact interval may also depend on the type of premises. For example, a bank or jewelry store may have more frequent contact with the central station than a residence.

Although the system is useful to allow communications through firewalls, it may be used where one or both of the communicating parties lacks a firewall. Advantages of such a system include obviating the need for user setup, as well as the need for an external data center to know the IP address of a device with which it needs to communicate.

Although in the system just described, the installation in secure contact with the premises has been described as a "central station," it need not be the same "central station" that monitors for and responds to alarm conditions. Instead, it is possible to distinguish between a central monitoring station, which performs those traditional alarm monitoring functions, and a central communications station, which merely guarantees the security of the communications link. While in some cases, both of those functions may in fact be performed by a single entity, it is within the present invention for those functions to be performed by separate facilities which may even be owned by separate entities. Thus, while traditional alarm companies will continue to operate central monitoring stations, they may contract with secure communications providers to operate central communications stations to provide secure Internet connections to their subscribers and then to relay the communications to them.

Indeed, that relay may take place over an Internet connection between the central monitoring station and the central communications station that is secured in the same way as the connection between the subscriber premises and the central monitoring station. Specifically, the central monitoring station, secure behind its firewall, will initiate all sessions with the central communications station using a shared private key encryption.

If the central monitoring station in such an embodiment wants to contact a subscriber premises unit, the central monitoring station initiates a session with the central communications station and transmits the message to the central communications station. The central communications station queues the message for the appropriate premises unit, and when that premises unit next checks in, the central communications station asks the premises unit to hold the channel open to receive the message from the central monitoring station. The central communications station then sends the message to the premises unit, and receives a response, if appropriate. If a response is received, it is queued up until the next time the central monitoring station checks in, at which time it is transmitted to the central monitoring station.

Similarly, if the premises unit has a message for the central monitoring station, it initiates a session with the central communications station and transmits the message to the central communications station. The central communications station queues the message until the central monitoring station next checks in, when the central communications station asks the central monitoring station to hold the channel open to receive the message from the premises unit. The central communications station then sends the message to the central monitoring station, and receives a response, if appropriate. If a response is received, it is queued up until the next time the premises unit checks in, at which time it is transmitted to the premises unit.

With such a secure communications system in place, there is no security reason not to rely on the Internet as the primary alarm reporting channel, insofar as it is clearly the fastest when it is available. If it is not available, one or more of the other communications channels can be used. Traditionally, if a primary communications channel fails, the system "fails over" to a secondary channel. In accordance with another aspect of the present invention, the system does not wait for failure of the primary channel before initiating contact on a secondary channel.

One way of operating such a "dynamic signalling" scheme in accordance with the invention would be to have both (or all if more than two channels are used—e.g., Internet, landline telephone, cellular telephone, control-channel cellular communications such as that known as MicroBurst® and available from Aeris Communications, Inc. of San Jose Calif., and/or radio) channels initiate communications at the same time, with the first method to succeed issuing instructions upon success for the other methods to terminate their attempts to communicate. This scheme has the advantage that the reporting of an alarm condition (or any other condition) need not wait until the primary channel fails before a secondary channel is tried.

On the other hand, the primary channel frequently works. Therefore, the dynamic signalling scheme just described could be considered inefficient in that it always initiates the back-up channel(s) even when no back-up is necessary. Therefore, in a refinement of the dynamic signalling scheme, the primary channel is given a "head start" before the secondary channel or channels are activated. For example, if the primary channel is the Internet, then a successful reporting session normally will be over in a few seconds. Therefore, the other channels automatically are engaged after, e.g., five seconds, unless a completion signal is received from the primary channel. If the primary channel is successful within five seconds, then there is no need to activate the other channels at all. If the primary channel is not successful within five seconds, it may yet be successful, but the other channels will be activated, with the first channel to succeed after that time terminating the other channels.

Various combinations of channels can be used. For example, the system could rely on control-channel cellular communications or the Internet as the primary channel, with landline dial-up as the backup channel. Or the Internet could be the primary channel, with control-channel cellular communications as the backup the channel. Any other combination of the various communications media could be used.

Once the external data network is present, other uses beyond security system reporting are possible. Thus, a properly equipped premises system keypad could be used as a terminal for accessing the external data network. In one preferred embodiment, when a user disarms the security system at a system keypad—e.g., on returning home—incoming electronic mail messages are displayed at the keypad. For this purpose, the system keypad preferably has an alphanumeric display, or an active-matrix, LCD or other flat-panel display, to display the electronic mail messages, although speech synthesis technology could be used to present the messages aurally using a speaker in the keypad. Preferably also, the keypad has a visual indicator to indicate the presence of messages to be displayed. An aural indication—such as a particular pattern of tones or a recorded or synthesized spoken announcement—of the presence of messages could be provided at the time of disarming the system, instead of, or in addition to, a visual indication.

If electronic mail is delivered by the system, then in one embodiment there is a particular electronic mail address associated with the system, and that mail would be displayed. In a more particularly preferred embodiment, a separate electronic mail address for each authorized user of the system is associated with the system, and the appropriate user's electronic mail messages are displayed based on the passcode, swipe card, coded transmitter or other token used to disarm the system, as discussed above in connection with telephone voice-mail messages. Thus, the announcement and/or display of electronic mail messages via the keypad is personalized to the user who is within the vicinity of, or is accessing, the keypad. Such personalization significantly enhances the usability and "user-friendliness" of the system.

In another embodiment of the invention, instead of, or in addition to, electronic mail messages, the system displays World Wide Web pages or similar data from the external data network. The data displayed are preselected by the user or users. Thus, the same data could be accessed regardless of who accesses the system, or the data could be personalized for individual users. For example, in a residential system, if an adult disarms the system, a stock market report might be displayed, while for a teenage child, an advertisement from a favorite retailer might be displayed. Similarly, on arming of the system, which ordinarily signifies that the user is leaving the premises, a traffic or weather report, or any other data preselected by the user, might be displayed. If a user has more than one passcode, or a transmitter with more than one button for arming or disarming the system, a different data selection could be associated with each passcode or button.

In another embodiment, the system is configured to allow retrieval of electronic mail messages from any one or more system keypads throughout the premises, separately from a disarm operation. This could be implemented in one embodiment by providing a special electronic mail retrieval key on the keypad, which would then prompt the user for a passcode to identify which of the potential authorized users is requesting retrieval of electronic mail, or in a second embodiment a special command sequence on a standard keypad could be used for the same function. In another embodiment, the various system keypads on the system could be configured in a local area network, allowing users at different keypads to independently and simultaneously retrieve electronic mail. In such an embodiment, the security system functions operate as in the non-networked embodiment.

In a further embodiment, the system keypad is provided with a full keyboard and is usable as a terminal to log onto the Internet or other external data network for any purpose, including composing and sending electronic mail, searching for information on the World Wide Web, etc. In a variation of this embodiment, the keypad is provided with a microphone for full sound operations, and optionally with stereo speakers instead of a single monaural speaker. In another variation, the keypad is also provided with a display, such as a liquid crystal or gas plasma display or a small cathode-ray tube display, for displaying graphics as well as text, and optionally with a video camera for full video operations.

The premises unit could perform all of these functions on its own, using its direct external data network (e.g., Internet) connection. However, for security reasons, it may be desirable to avoid general contact between the premises unit and other Internet users. Therefore, in a system where the premises unit communicates with a central communications station as described above (whether or not the central communications station is also the central monitoring station), the central communications station could maintain, by user subscription, records of user e-mail addresses and content preferences (i.e., what news, weather, advertising, etc., the user wishes to receive, and when), retrieve the data from the Internet (e.g., using appropriate "agents") and send it to the premises unit based on received passcodes. If direct interactive Internet use is available on the system (which may depend, primarily, on how good the keyboard is on the user interface), the central communications station would act as a proxy for the premises system to access the Internet, maintaining the secure link to the premises.

According to another feature of the invention, a user's passcode unlocks other passwords that the user may have with other institutions, such as banks or other financial institutions. In one embodiment, the passwords are stored in the premises controller. Based on the entry of a user's passcode to access the system, if the user then initiates a session with one of those institutions, the appropriate password is transmitted, when needed, to the institution without further action by the user. Preferably, the user also could access the system using a transmitter or other coded token and the system would send the corresponding passcode when authenticating the financial transaction.

In another embodiment, the user's security system passcode is registered with the institutions as a secure identifier of the user. When the user accesses the premises system with his or her passcode or coded token and then uses the external data network to log into the financial institution, the passcode is sent to the institution and is recognized as a secure authorization. While this function would have to be by agreement and prior arrangement with the financial institution, it is potentially more secure, or at least less risky, than sending a personal identification number ("PIN") over the external data network, even in encrypted form.

In a particularly preferred embodiment, the passwords are stored at the central communications station. If the user wants to perform, e.g., a banking transaction, the users accesses a software banking agent at the central communications station and specifies the transaction, but need not enter his or her password for that bank. Instead, the software agent retrieves the password stored at the central communications station and processes the transaction with the bank. This arrangement requires users to trust their passwords to the central communications station, but the users are already entrusting the central communications station with their safety and valuable property, so it is likely they would feel comfortable entrusting the central communications station with their passwords.

In addition to providing the external data network functions at system keypads, in another embodiment the system also has a port or ports to which one or more external terminal devices can be connected to use the external data network connection. For example, one or more personal computers could be connected to the system for that purpose.

In another embodiment, the system could be accessed, with appropriate passwords and other security provisions, from an external computer or terminal on the external data network. Thus, parameters of the security system could be programmed remotely using the external data network rather than a dial-in connection as described above. In addition, certain security system data, such as the state of various sensors, could be accessed over the external data network or sent periodically to a predetermined address on the external data network. For example, if one of the sensors is a video camera, the video output could be sent periodically to a predetermined recipient. Similarly, the system could be connected to home automation devices—such as those compatible with the X-10® system developed by X-10 Limited, of Hamilton, Bermuda—that allow lights, temperature and other functions to be remotely controlled.

Access to the premises system from the external data network preferably also is through the central communications station. For example, the central communications station could maintain a World Wide Web site through which subscribers could contact their home systems from elsewhere. Thus, a subscriber at his or her place of employment could log onto that web site and issue a command to turn on a certain appliance in the home. The systems at the central communications station, after being satisfied that the user is authorized, would queue up those instructions until the next time the home system makes contact, at which time the instructions would be sent, and the appliance would be turned on.

The invention will now be described with reference to FIGS. 1–7.

A preferred embodiment of a premises security system 10 according to the present invention is shown in FIG. 1. A system controller 11, similar to a Model 6139T available from the Alarm Device Manufacturing Company ("Ademco," a division of Pittway Corporation), of Syosset, N.Y., is modified to communicate over a bus 12, preferably a four-wire bus, with at least one communications interface 13. Communications interface 13 can be a telephone answering/voice-mail/PBX type interface as described above. Alternatively, communications interface 13 can be an external data network/Internet interface, also as described above, which may be a router or ADSL (asymmetric digital subscriber loop) interface, providing continual access to the Internet over external communications line 14 which may be a suitable persistent Internet connection. Communications interface 13 also could be a modem, preferably a 56 kbps modem, providing a dial-up connection over external communications line 14, which could be a standard analog telephone line. Controller 11 preferably has a back-up battery 113 serving at least both controller 11 and communications interface 13.

System 10 also includes conventional sensors 15, which may include security or fire sensors or both, and one or more conventional or enhanced system keypads 16 as discussed above and as described in more detail below. Keypads 16 may be connected directly to controller 11 in the conventional manner, as shown, in which case the communications functions are routed between keypads 11 and communications interface 13 through controller 11. Alternatively, keypads 16 may be connected to bus 12 for routing of both security system signals to and from controller 11 and communications functions to and from communications interface 13. In yet another alternative, keypads 16 can be connected both directly to controller 11 (for security functions) and to bus 12 (for communications functions). Controller 11 preferably is connected to a sounder 110 (e.g., a bell or siren) for sounding alarm conditions, and preferably is connected to a dialer unit 111 for communicating with a central monitoring station over, e.g., a standard telephone line.

One or more communications devices 17 could be connected to communications interface 13, either by a direct connection or through bus 12 as shown (but ordinarily not through both connections). Communications devices 17 could be telephone sets if communications interface 13 is a telephone system interface as described above, or could be personal computers or computer terminals if communications interface 13 is a data network interface as described above.

Figure 2:
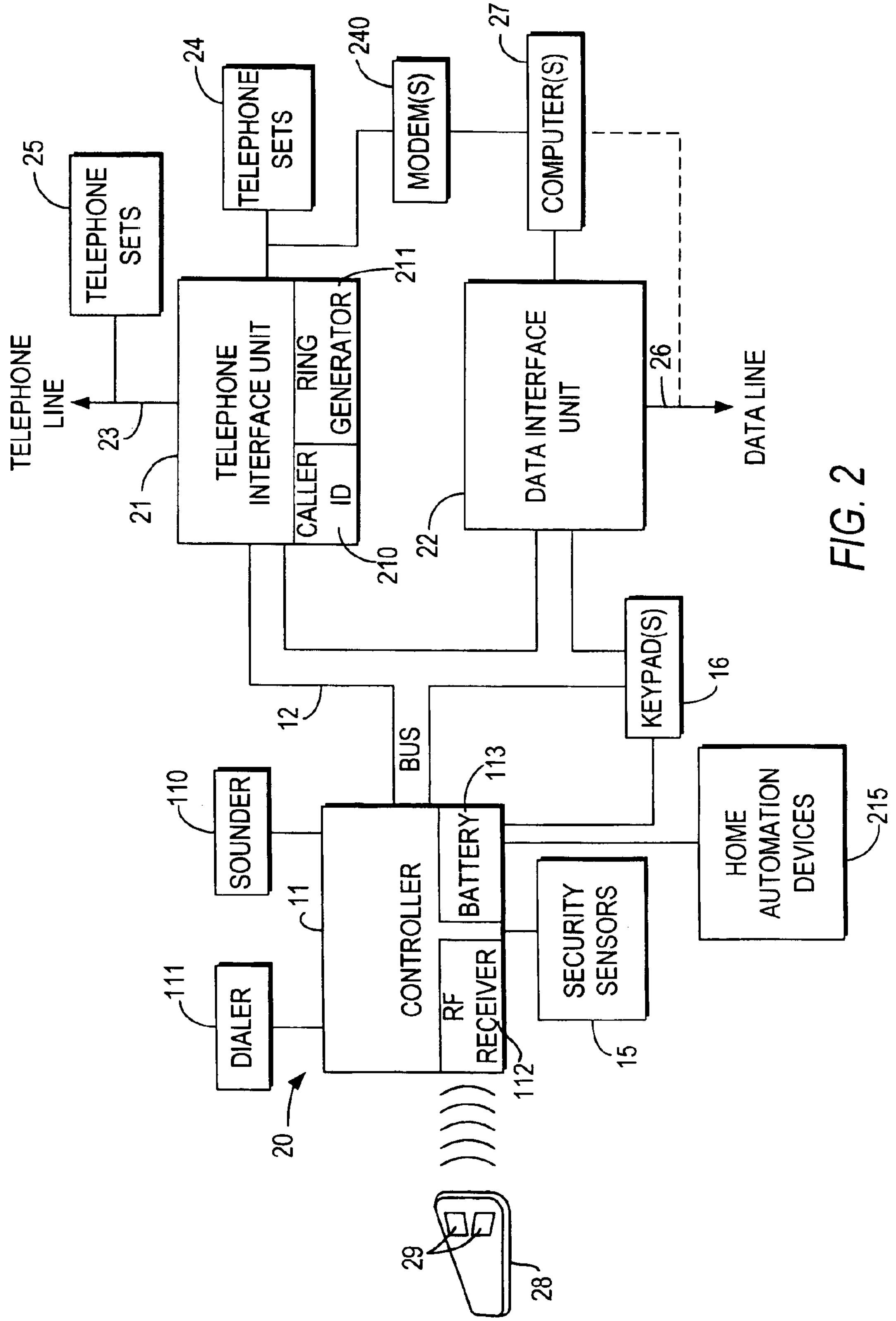
FIG. 2 is a simplified schematic diagram of a second preferred embodiment of a security system in accordance with the present invention.

If communications interface 13 is a telephone system interface, telephone sets 17 preferably would be connected directly to communications interface 13, although additional telephone sets could be connected directly to the central office telephone line (see FIG. 2). Communications devices 17 could also include a modem connected to a personal computer, allowing the personal computer to be used to access the communications interface 13 in the manner described above, for programming features of communications interface 13, or for downloading and storing incoming voice mail messages from communications interface 13.

If communications interface 13 is a data network interface, personal computers or computer terminals 17 preferably are connected to communications interface 13 via bus 12, although a direct connection (e.g., a local area network Ethernet connection) can also be used.

FIG. 2 shows another preferred embodiment of a system 20 in accordance with the invention. System 20 is similar to system 10, except that a separate telephone interface unit 21 and a separate data interface unit 22 are shown. It should be clear, however, that the system according to the invention could include only one or the other of interfaces 21, 22.

As shown, in system 20, sensors 15, keypads 16, sounder 110 and dialer 111 are connected to controller 11 as in system 10 of FIG. 1. Telephone interface unit 21, which preferably is connected to standard analog telephone line 23, preferably is connected to controller 11 by bus 12. A first group of telephone sets 24 preferably is connected to telephone interface unit 21. The telephone answering/voice-mail/PBX functions described above preferably are available at keypads 16 either via bus 12, or through controller 11 to which keypads 16 may be directly connected. The telephone answering/voice-mail/PBX functions described above may also be available to those telephone sets 24 connected to telephone line 23 through telephone interface unit 21. Another group of one or more telephone sets 25 may be connected directly to telephone line 23. In one embodiment of the invention, the telephone answering/voice-mail/PBX functions described above would not be available at telephone sets 25. However, in an alternative embodiment of the invention, telephone interface unit 21 could monitor telephone line 23 for DTMF tones signifying certain command signals, and provide the corresponding functions even to telephone sets 25. However, telephone interface unit 25 would be unable to disconnect any one of telephone sets 25 from telephone line 23, and therefore could not perform any function that required such a disconnect, such as the public address function over keypad speakers. A limited number of functions, where the dialing of the commands would not cause a telephone call to be placed, might be available.

Data interface unit 22, which preferably is connected to data line 26, preferably is connected to controller 11 by bus 12. Optionally, one or more personal computers or computer terminals 27 preferably is connected to data interface unit 22—e.g., by a local area network (shown as a direct link to data interface unit 22)—for the purpose of sharing data line 26. The data functions described above preferably are available at keypads 16 either via bus 12, or through controller 11 to which keypads 16 may be directly connected. The data functions described above may also be available to those personal computers or computer terminals 27 connected to data interface unit 22. Alternatively, personal computers or computer terminals 27 could simply share data line 26 by an alternate connection shown in broken line, without being connected to data interface unit 22.

One or more of personal computers or computer terminals 27 can also be connected to telephone interface unit 21 via one or more modems 240 in the manner described above, for programming features of telephone interface unit 21, or for downloading and storing incoming voice mail messages from telephone interface unit 21.

Data interface unit 22 preferably also has access to data from one or more of sensors 15, such as a security camera, for transmission of the sensor data over the Internet or other external data network for viewing by an authorized person, and to home automation devices 215 for remote actuation as described above.

Controller 11 of system 20 preferably also includes a radio-frequency or other (e.g., infrared) receiver 112 which receives coded signals from one or more transmitters 28. A simple transmitter might have one button 29, to send a code identifying a particular authorized user for, e.g., arming or disarming the system. A more complicated transmitter 28 might have two (or more) buttons 29 for allowing a single user to send one of two (or more) different signals for performing different functions (as described above).

Figure 3:
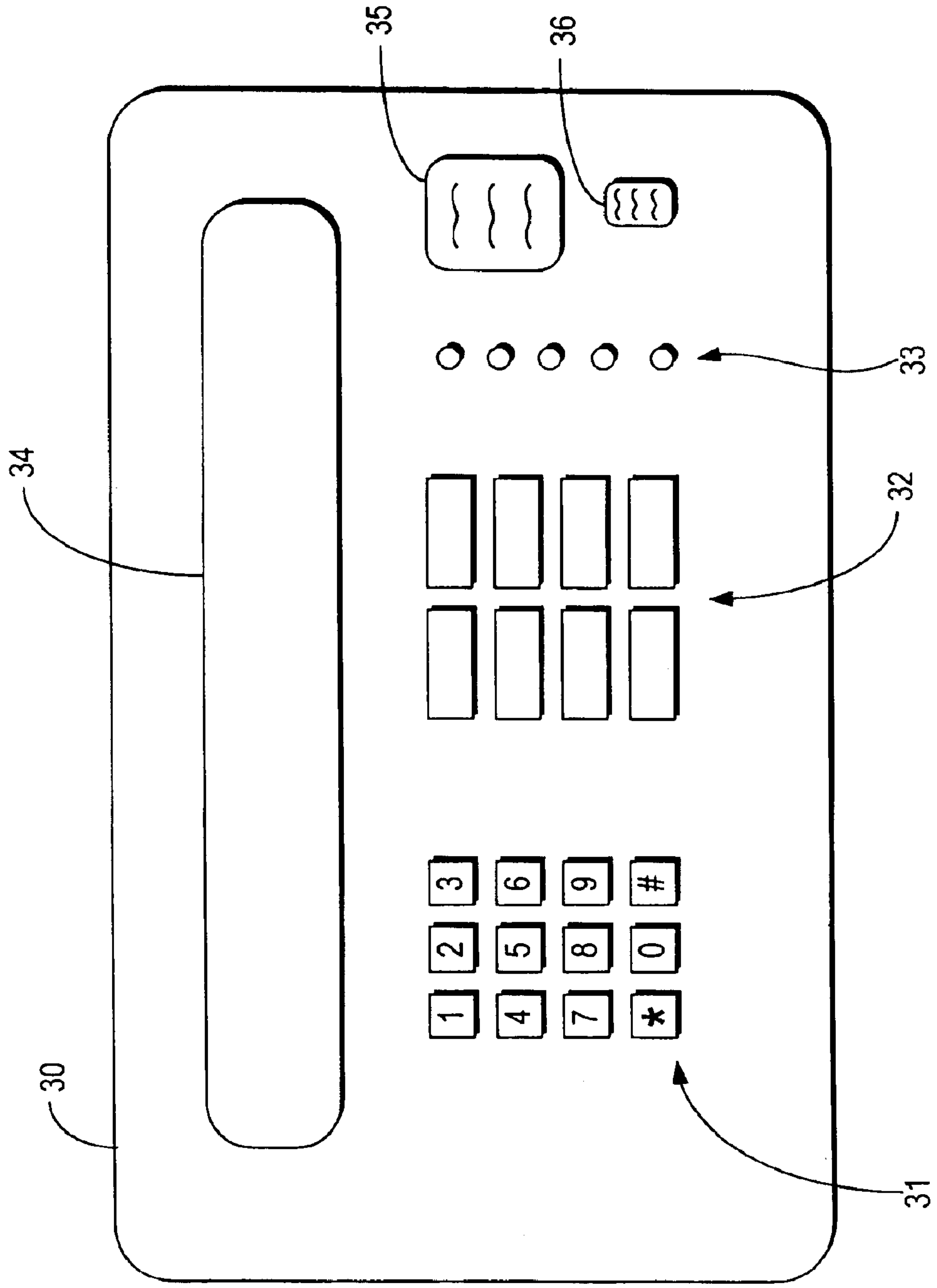
FIG. 3 is an elevational view of a first embodiment of a keypad for use in a system according to the invention.

FIG. 3 shows one embodiment of a conventional security system keypad 30 which could be used with the invention, particularly if only telephone interface functions are to be provided at the keypad. Keypad 30 preferably includes a standard telephone-type numeric keypad, including the digits 0–9 and, preferably, the symbols "*" and "#". These could be used to issue standard security system commands, such as entering passcodes, or telephone interface commands. Function buttons 32 preferably are also provided for entry of system commands. Visual indicators 33, which preferably are light-emitting diodes, but which also may be light bulbs or other indicators, are provided to perform standard security system indications—e.g., a warning that a zone is bypassed, an indication that the system has been in alarm, an AC power failure, etc.—as well as telephone interface indications such as a message waiting indication. Alphanumeric display 34, which may be a standard two-line, sixteen character per line, display, also provides security system indications, and telephone interface indications such as, e.g., calling party identification data.

Keypad 30 preferably also has a speaker 35, as is conventional for providing, e.g., a pre-alarm aural indication, which may also be used to provide aural telephone interface indications such as an aural message waiting indication, and more particularly may be used for the playback of messages. Speaker 35 could also be used to allow a user to make telephone calls (using keys 31) to announcement-only or voice-response telephone numbers where two-way communication is not necessary. In an alternative embodiment, keypad 30 includes a microphone, allowing the recording of outgoing voice-mail greetings. If the system is configured, as just discussed, to allow telephone calls to be placed from keypad 30, microphone 36 could be used to make such calls.

Figure 4:
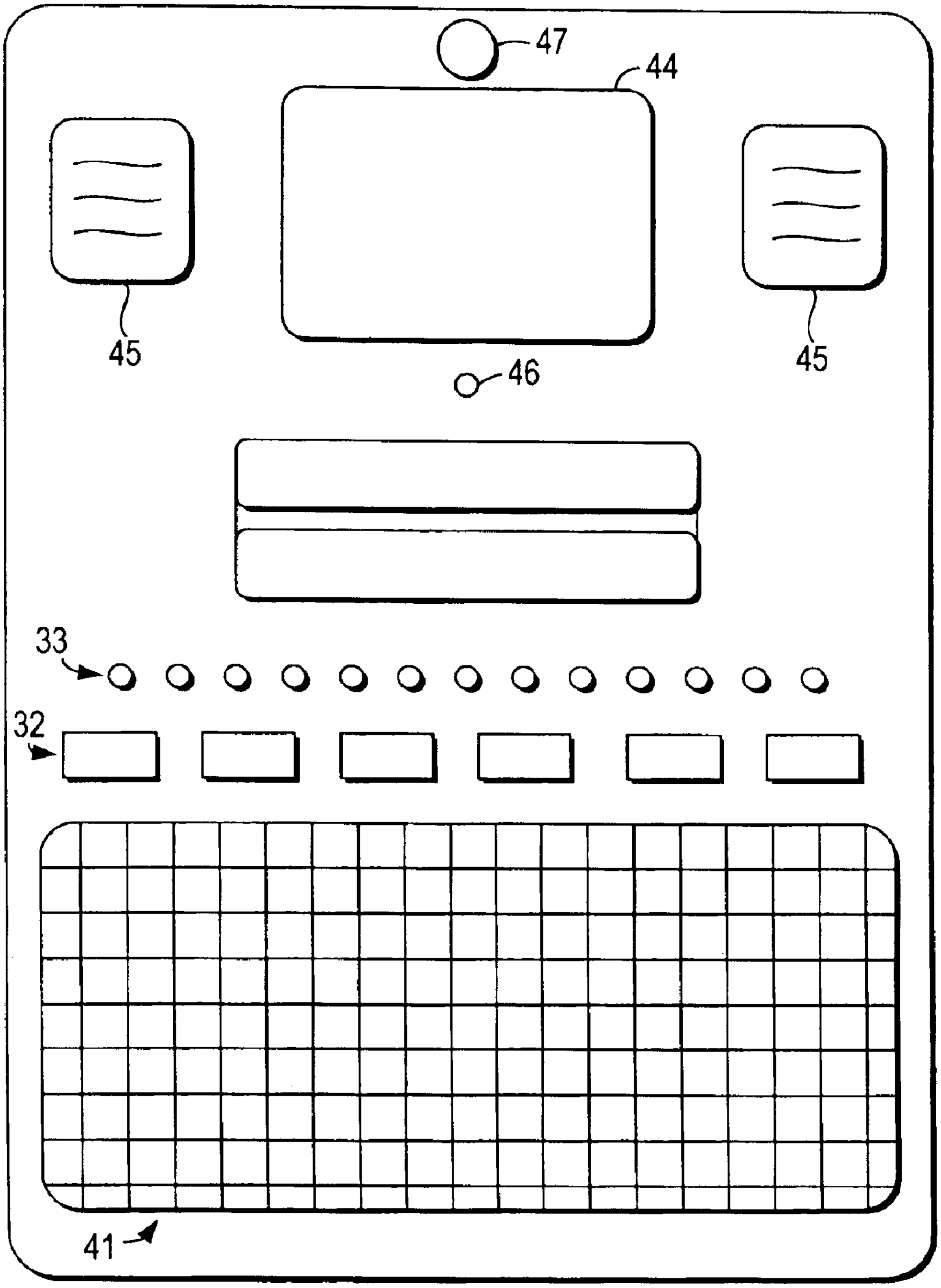
FIG. 4 is an elevational view of a second embodiment of a keypad for use in a system according to the invention.

FIG. 4 shows an embodiment of a preferred embodiment of an enhanced keypad 40 designed to work with data interface unit 22 to perform data functions. Thus, keypad 40 preferably has, instead of numeric keypad 13, a full alphanumeric keypad 41, along with function buttons 32 and visual indicators 33. Keypad 40 preferably also has a full graphic display 44 in place of alphanumeric display 34. Display 44 could be a liquid crystal display ("LCD"), gas plasma display or cathode-ray tube ("CRT"), which could be a color or monochromatic display. Display 44 could further provide touch screen capability, in which case alphanumeric keypad 41 could be a "soft" keypad that can be called up on display 44 when desired. Preferably, keypad 40 also has two speakers 45, for stereo audio functions, if necessary, although in an alternative preferred embodiment only one speaker 45 may be provided. Keypad 40 preferably also has a microphone 46, and optionally has a video camera 47 for full-duplex video functions, if necessary.

Figure 5:
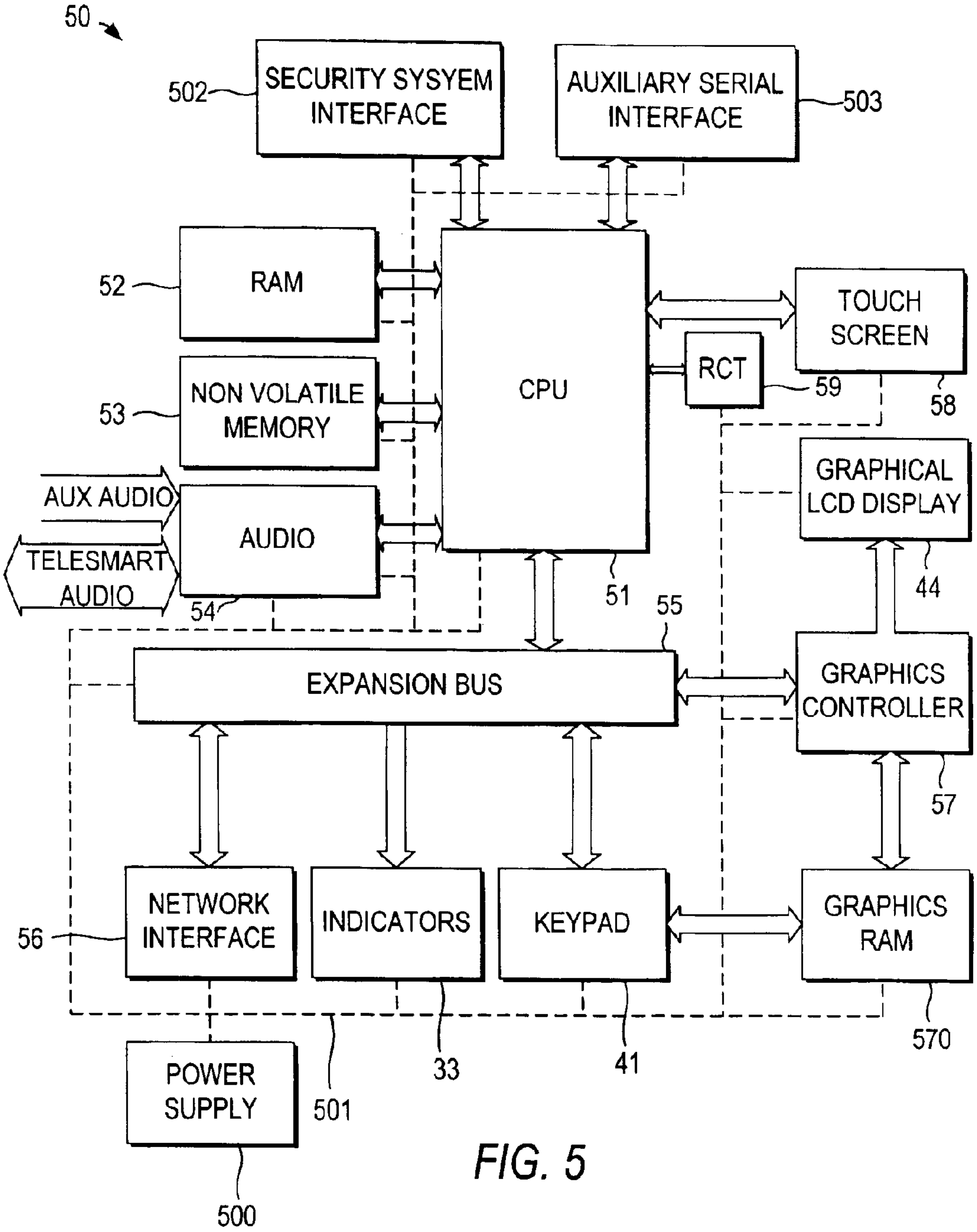
FIG. 5 is a simplified schematic diagram of the circuitry of the keypad of FIG. 4.

A schematic block diagram of circuitry 50 of a keypad similar to keypad 40, but incorporating some of the functions of data interface unit 22, is shown in FIG. 5. If multiple such keypads are provided, the additional "slave" keypads may omit the data interface circuitry, or may include it even though it may be redundant. Circuitry 50 preferably is built around a central processing unit ("CPU") 51 such as an 80386 or equivalent microprocessor, available from Intel Corporation, of Santa Clara, Calif. Preferably connected to CPU 51 is random-access memory ("RAM") 52 as well as non-volatile memory 53 (e.g., NVRAM). If the system uses shared private key encryption as discussed above, the private key preferably is stored in non-volatile memory 53. An audio interface 54 preferably also is provided, interfacing with external data network 26 for audio input/output functions, as well as interfacing with audio signals from telephone interface unit 21, if present in the system.

Expansion bus 55 preferably connects CPU 51 to keypad 41 and indicators 33. Expansion bus 55 also preferably connects to a network interface 56 which allows several keypads 50 to be attached to system 20 for operation of the security functions of controller 11, for independent access to external data network 26, and for connection to other keypads 50 in a local area network on the premises served by system 20. A graphics controller 57, preferably having its own associated graphics RAM 570, preferably is also connected to bus 55 allowing CPU 51 to drive graphical LCD display 44. A touch screen interface 58 connected to CPU 51 preferably is integrated (not shown) with display 44.

A real-time clock 59 preferably is provided for CPU 51, and the entire circuitry 50 preferably is powered by a 12-volt DC power supply 500 as indicated by dashed lines 501.

Finally, interface 502 connects to controller 11, preferably via bus 12, while connection to external data network 26 preferably is provided by serial interface 503 which is, or connects to, a router, ADSL interface, modem or other data connection device.

Figure 6:
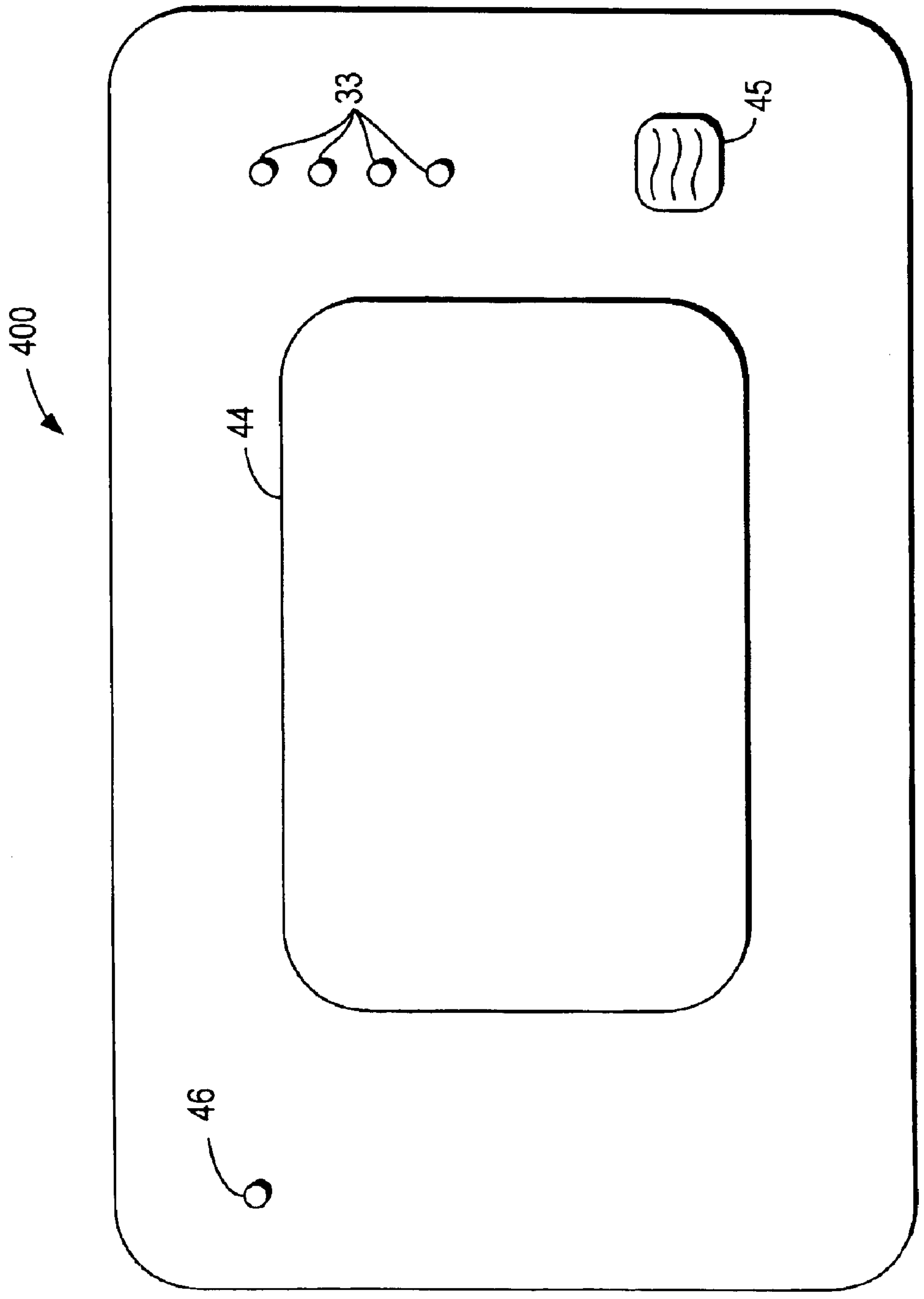
FIG. 6 is an elevational view of a third embodiment of a keypad for use in a system according to the invention.

A preferred embodiment 400 of a simplified keypad for use with the invention is shown in FIG. 6. Keypad 400 preferably includes a subset of the features of keypad 40. Thus, it preferably includes a full graphic display 44 with touch screen capability, avoiding a full alphanumeric keypad 41, but allowing for a "soft" keypad that can be called up on display 44 when desired. Preferably, keypad 400 also has one speaker 45 and a microphone 46.

Figure 7:
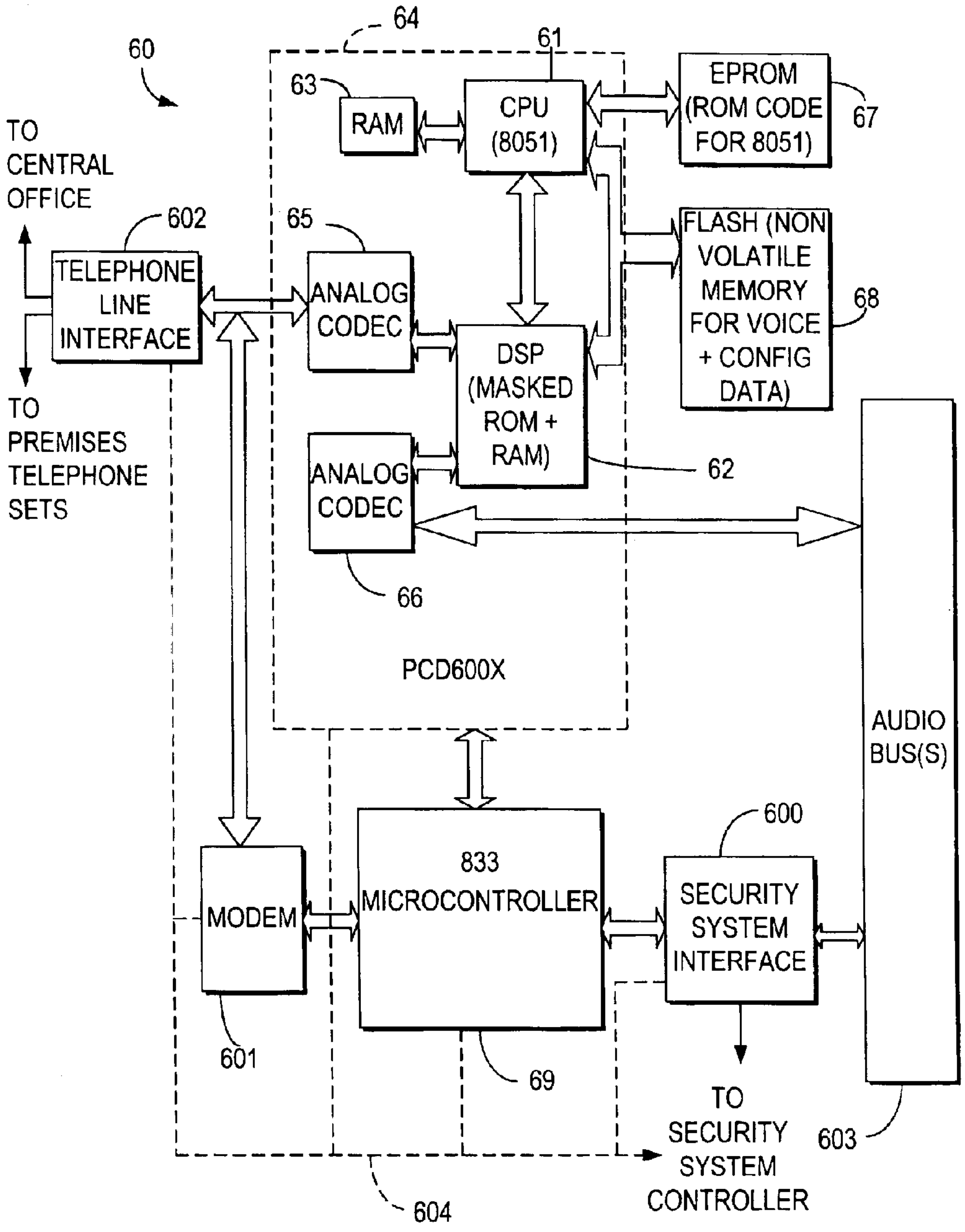
FIG. 7 is a simplified schematic diagram of a preferred embodiment of a telephone interface unit according to the invention.

A schematic block diagram of circuitry 60 of a preferred embodiment of a telephone interface unit 21 according to the invention is shown in FIG. 7. A central processing unit (CPU) 61 preferably controls the various telephone interface and voice-mail/telephone answering functions described above, as is conventional. Digital signal processor (DSP) 62, connected to CPU 61, handles the voice processing functions required for the voice-mail/telephone answering functions. As discussed above, DSP 62 preferably allows full-duplex operation, so that if an incoming call is not picked up on one of the premises telephones, and system 60 answers the call, the caller (if sufficiently aware of system functions) preferably can announce him- or herself over the system speakers even while the outgoing message is playing (in case the residents are home and may want to answer the call). DSP 62 preferably also includes a built-in DTMF decoder that interprets dual-tone/multifrequency (i.e., "Touch-Tone") keystrokes made at premises or remote telephone sets to allow entry of system commands from such telephone sets.

CPU 61 and DSP 62 are connected to random access memory 63, all preferably provided as a single chipset 64 along with two CODECs 65, 66. One suitable chipset is the PCD600X family of chipsets available from Philips Electronics, N.V., of Eindhoven, Netherlands. These chipsets include an 8051 CPU core, 756 bytes of on-board RAM, a 16-bit fixed point DSP (with ROM code masked), two analog CODECs and general purpose 8-bit digital-to-analog and analog-to-digital converters. Model PCD6002 includes 32 kilobytes of OTP ROM, while model PCD6001 is ROMless but can be used, e.g., with 64 kilobytes of external EPROM memory 67. In addition, flash memory 68 can be provided, where voice messages and other voice and configuration data may be stored.

Chipset 64 is connected to a microcontroller 69, such as a P87CL883 microcontroller, also available from Philips Electronics, which in turn is connected to a security system interface 600, preferably allowing control of security system controller 11 from connected telephone sets as discussed above, and preferably allowing access to voice-mail functions at system keypads. Microcontroller 69 arbitrates traffic between security system 11 and CPU 61/DSP 62, to determine, e.g., whether a signal or command from a keypad or telephone set is intended as a security system command or a PBX/voice mail/answering machine command, or conversely whether a signal or command from security system 11 or CPU 61/DSP 62 is intended as a telephone-related command or a security system command. This allows commands to be routed properly, and also allows devices to be taken on-line or off-line as appropriate (e.g., to disconnect telephone sets from the central office phone line when a telephone set is being used to broadcast a message over the keypad speakers).

A modem 601, as may be conventional, may be connected to telephone line interface 602 for purposes described above. In addition, modem 601 could serve as a back-up security communications device, allowing controller 11 to communicate with a central monitoring station if normal channels are unavailable.

Telephone line interface 602 is also connected via CODEC 65 to CPU 61 and DSP 62 to allow CPU 61 and DSP 62 to perform the PBX/voice mail/telephone answering functions described above. CODEC 66 connects DSP 62 to security system audio bus 603 (also connected to security system interface 600), allowing circuitry 60 to communicate with security system keypad speakers. In addition, telephone line interface 602 connects the central office telephone line and the premises telephone sets to the system and to each other. Those connections preferably are made through suitable relays (not shown) so that in the event of a power failure, the central office telephone line would be connected directly to the premises telephone sets, maintaining telephone service on the premises.

The entire circuitry 60 preferably is powered by a nominal 12-volt DC power supply from security system controller 11, as indicated by dashed lines 604.

Figure 8:
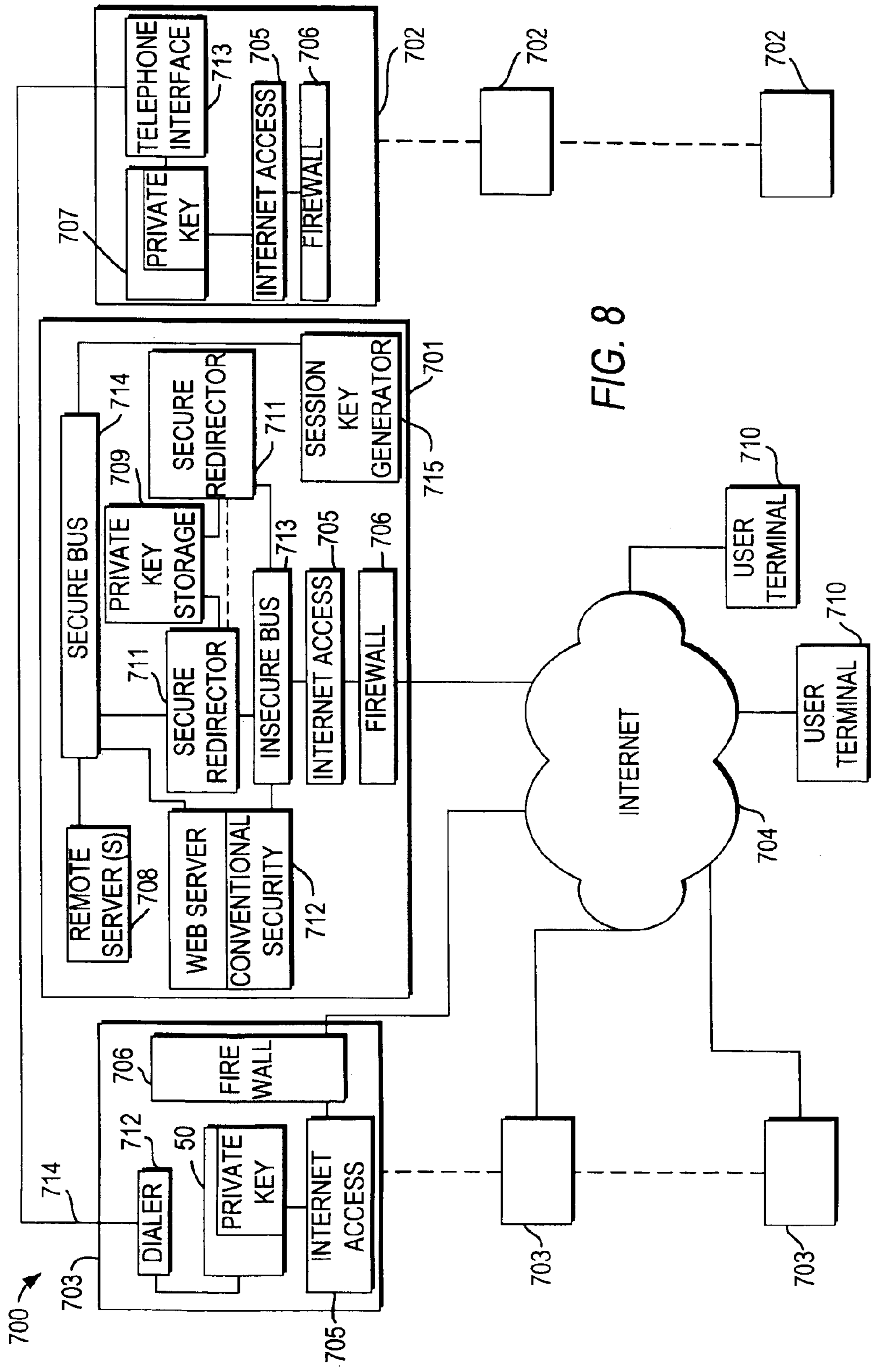
FIG. 8 is a simplified schematic diagram of a preferred embodiment of a communications system according to the invention.

A communications system 700 as described above, incorporating the present invention, is shown in FIG. 8. Communications system 700 includes a central communications station 701, at least one central monitoring station 702 (a central monitoring company that subscribes to the central communications system could have more than one monitoring station, or more than one monitoring company could subscribe), and a plurality of premises systems 703, all connected to the Internet 704.

Each premises system 703 preferably includes a system 10 as shown in FIG. 1, preferably including an interface unit 50 as shown in FIG. 5 storing a private key. System 10 within system 703 has an Internet access unit 705, with access controlled by firewall 706.

Each central monitoring station 702 similarly has a processor 707 storing a private key, an Internet access unit 705 and a firewall 706. Processor 707 includes data storage (not shown) storing one or more databases identifying premises to be monitored and the level of service for each of those premises, a database of actions to be taken in case of various alarm conditions or other unusual conditions, etc.

Central communications station 701, in addition to having an Internet access unit 705 and a firewall 706, has remote application servers 708 (these may be located elsewhere at the premises of the providers of the services on servers 708). Central communications station 701 also includes secure redirectors 711 which have access to private key storage 709 to store the private keys of all of the systems with which it communicates. Redirectors 711 perform the encryption and decryption using those keys to communicate with those systems.

Central communications station 701 communicates with the Internet 704 through firewall 706 and Internet access unit 705, connecting the Internet to insecure bus 713. Communications on insecure bus 713 that are destined for remote servers 708 pass through redirectors 711 to secure bus 714, with security based on the private keys stored at 709.

Another web server 712 maintains the web site described above that allow users from any Internet access location 710 to issue instructions to premises systems 10. Because the point of web server 712 is to allow a user at any Internet access point 710 to access his or her secure system 703, and access point 710 likely is not registered to use redirectors 711, web server 712 preferably is protected, as shown, by conventional security such as SSL (secure socket layer) encryption, smart cards, etc.

Among remote servers 708 are relay servers to relay communications between the various systems 702, 703, as well as from server 712 to units 50 of premises systems 10 in units 702, as described above, after secure channels are opened by secure redirector units 711.

Central communications station 701 may be separate from central monitoring station 702 as shown, or stations 701 and 702 could be combined or co-located. Similarly, regardless of their relative locations, they could be operated by the same or different parties.

The communications system as described could be used to offer or implement a number of security features.

One function of central alarm monitoring systems is to "supervise" high-security premises systems such as a bank alarm system. Traditionally, a poll-and-response system was used in which the central station contacted each supervised system individually on a periodic basis to make sure it received a response, and to check the system's status. If it did not, or if its status was not normal, appropriate action was taken. In later systems, the supervised system simply called in periodically on its own, without the need for polling. Again, appropriate action was taken if the supervised system did not check in on time, or its status was not normal. In accordance with the current invention, because the premises system has to check in periodically, it can be programmed to report its status at the same time. The system's failure to check in, or to report a normal status, is acted upon appropriately.

Similarly, two premises systems 10 can be made to operate as a single system by communicating through central communications station 701. For example, if a company has multiple locations, passcodes for individual employees can be entered only in the system at their "home" location, but the systems at other locations would recognize those passcodes because the systems could communicate through central communications station 701. Although such systems can be implemented by running wires between adjacent buildings, the present invention allows such systems to be implemented between far-flung locations without running wires or leasing expensive dedicated lines.

Another function that could be implemented using the present invention is the download of configuration data to system 10. Configuration data for user interface 16 or 50, including web site preferences for various users, etc., as well a security configuration data for controllers 11, could be stored at a remote server 708 and downloaded when its particular system checks in to see if any other system wants to contact it. In the case of downloading of the configuration of security controller 11, this eliminates the need for central alarm station operators to maintain separate dialer banks for downloading as they do now.

In accordance with another function of the present invention, if one of home automation devices 215 is a video camera, the system allows a user at any terminal 710 on the Internet to securely access that video feed. The user logs onto web server 712 and requests the video feed. The next time the system 703 of which the desired video camera is a part checks in, redirector 711 established a link to server 712, which relays the video feed to the user. In an alternative to this embodiment, which consumes a lot of bandwidth because of the nature of video, the system can avoid relaying the video, and thereby conserve bandwidth, by enabling secure direct communications between terminal 710 and system 703. This can be done by, after authenticating both parties, sending to each party a session key (generated, e.g., by secure session key generator 715) and the IP address of the other party, and allowing the parties to communicate directly. Each party knows that it received the session key and the other party's address securely, and therefore when they establish communications with each other, they are confident that the communication is authorized. In fact, such an arrangement can be used even for low-bandwidth communications if desired.

Although each of the components of communications system 700 as shown includes a firewall 706, firewall 706 could be omitted from one or more components. As discussed above, the system has advantages even without firewalls.

In another embodiment system 10 need not include any security features at all. Instead, system 10 could include only communications features, and communications system 700 could be a system for secure communications for any Internet users who desire it. Subscribers to communications system 700 could remain secure behind their firewalls, with sessions initiated only by their own systems 10 through secure redirectors 711. If one subscriber were to communicate with another subscriber, each would communicate only when their own respective system initiated the session with redirectors 711. A communication, from the first subscriber to initiate a session, that is destined for another subscriber, would be held by redirectors 711 until the second subscriber, for whom the communication is intended, until the second subscribers unit initiated its own session. At each subscriber location, one or more personal computers could be attached to system 10 if desired.

Preferably, in an embodiment including security features, each system 10 includes at least one secondary communications channel, illustrated in FIG. 7 as dialer 712, which preferably is connected to telephone interface 713 of monitoring station 702 by public switched telephone line 714. Of course, the secondary channel may instead, or also, include one or more alternate channels such as a cellular telephone, control-channel cellular, or a radio link (not shown). As discussed above, the system could try both (or all) channels, with the first channel to succeed issuing a signal or command through system 10 to terminate the other channel(s). However, also as discussed above, preferably the primary channel is started ahead of (e.g., five seconds ahead of) the secondary channel(s). The secondary channels are initiated only if the primary channel is not successful within the "head start" period. After that, all of the channels attempt to communicate with monitoring station 702 and the first to succeed, which may still be the primary channel (e.g., if the Internet is the primary channel, there may have been a delay caused by heavy traffic), will upon success terminate the other channels by issuing a signal or command through system 10.

The primary channel, which is given the head start, is preferably the fastest channel, because if it works, it normally will work fast enough to avoid having to activate the other channels. In a system where the Internet is available as a channel, it would be the fastest channel. Control-channel cellular would be the next fastest and would be given the head start in a system without Internet access. Radio would be the next fastest and would be given the head start in a system without Internet access or control-channel cellular. Cellular and landline telephones have comparable speeds; if they are the only available channels, the landline telephone is normally tried first and given the head start.

A user of the system according to the invention preferably can access telephone and data functions at one central location on entering the premises. Thus it is seen that a security system is provided that minimizes the number of electronic devices to which an individual must attend on returning home, by combining the functions of several of those devices. The system can also be used at any time that the user is at home. Secure communications between the premises system and other systems is also provided. One skilled in the art will appreciate that the present invention can be practiced by other than the described embodiments, which are presented for purposes of illustration and not of limitation, and the present invention is limited only by the claims that follow.

What is claimed is:

1. A security system for monitoring user premises, said system comprising:

at least one sensor;

at least one alarm output device;

at least one user control interface; and a system controller connected to said sensor, said output device and said user control interface; wherein:

at least one of said at least one user control interface is located at the user premises and is further connected to an external data network for at least one of (a) sending, and (b) receiving, data; and said at least one user control interface allows a user at the user premises to interact with said system controller and said data.

2. The security system of claim 1 wherein said data comprise electronic mail.

3. The security system of claim 1 wherein said at least one user control interface:

is used by a user to enter commands affecting a state of said system, said system, when said state indicates that said system is active; and monitors said at least one sensor and outputs an alarm on said alarm output device when said at least one sensor indicates that an alarm condition exists.

4. The security system of claim 3 wherein:

said data comprise electronic mail; and access to said electronic mail is restricted based on said state of said system.

5. The security system of claim 4 wherein said electronic mail is accessible when said state is consistent with presence of an authorized user on said premises.

6. The security system of claim 5 having a plurality of authorized users, and having an authorization unit for uniquely identifying each of at least one of said authorized users, wherein:

a particular authorized user initiates said state consistent with presence of an authorized user by activating said authorization unit using an indicium unique to said particular authorized user; and said user control interface presents for access at said user control interface only electronic mail addressed to said particular authorized user.

7. The security system of claim 6 wherein:

said user control interface comprises a keypad;

said indicium comprises a respective passcode unique to each said at least one authorized user; and said activating of said authorization unit comprises entry of said passcode at said keypad.

8. The security system of claim 6 wherein:

said user control interface comprises a receiver;

said indicium comprises a respective transmitter uniquely coded to each of said at least one authorized user; and said activating of said authorization unit comprises activation of said coded transmitter in communication range of said receiver.

9. The security system of claim 8 wherein said receiver and said coded transmitter are wireless.

10. The security system of claim 6 wherein:

said user control interface comprises a token reader;

said indicium comprises a token uniquely coded to each of said at least one authorized user; and said activating of said authorization unit comprises presentation of said coded token to said reader.

11. The security system of claim 5 having a plurality of authorized users, and having an authorization unit for uniquely identifying each of at least one of said authorized users, wherein:

a particular authorized user initiates said state consistent with presence of an authorized user by activating said authorization unit using an indicium unique to said particular authorized user; and said user control interface presents access at said user control interface to electronic mail message sending from said particular authorized user.

12. The security system of claim 11 wherein:

said user control interface comprises a keypad;

said indicium comprises a respective passcode unique to each of said at least one authorized user; and said activation of said authorization unit indicium comprises entry of said passcode at said keypad.

13. The security system of claim 11 wherein:

said user control interface comprises a receiver;

said indicium comprises a respective transmitter uniquely coded to each of said at least one authorized user; and said activation of said authorization unit comprises activation of said coded transmitter in communication range of said receiver.

14. The security system of claim 13 wherein said receiver and said coded transmitter are wireless.

15. The security system of claim 11 wherein:

said user control interface comprises a token reader;

said indicium comprises a respective token uniquely coded to each of said at least one authorized user; and said activation of said authorization unit comprises presentation of said coded token to said reader.

16. The security system of claim 1 wherein:

said data comprise electronic mail;

said system has at least one authorized user, and has an authorization unit for uniquely identifying each of at least one of said authorized users; and when one of said at least one authorized user enters a security system command at said user control interface by activating said authorization unit using an indicium unique to said one of said at least one authorized user, said user control interface sends an electronic mail message to a predetermined recipient advising of said entry of said command by said user.

17. The security system of claim 16 wherein:

said user control interface comprises a keypad;

said indicium comprises a respective passcode unique to each of said at least one authorized user; and said activation of said authorization unit comprises entry of said passcode at said keypad.

18. The security system of claim 16 wherein:

said user control interface comprises a receiver;

said indicium comprises a respective transmitter uniquely coded for each of said at least one authorized user; and said activation of said authorization unit comprises activation of said coded transmitter in communication range of said receiver.

19. The security system of claim 18 wherein said receiver and said coded transmitter are wireless.

20. The security system of claim 16 wherein:

said user control interface comprises a token reader;

said indicium comprises a token uniquely coded to each of said at least one authorized user; and said activation of said authorization unit comprises presentation of said coded token to said reader.

21. The security system of claim 1 wherein:

said external data network is the Internet;

said data comprise World Wide Web pages;

said system has at least one authorized user, and has an authorization unit for uniquely identifying each of at least one of said authorized users; and when one of said at least one authorized user enters a security system command at said user control interface by activating said authorization unit using an indicium unique to said one of said at least one authorized user, said system retrieves a World Wide Web page directed to said one of said at least one authorized user and displays said World Wide Web page at said user control interface.

22. The security system of claim 21 wherein:

said user control interface comprises a keypad;

said indicium comprises a respective passcode unique to each of said at least one authorized user; and said activation of said authorization unit comprises entry of said passcode at said keypad.

23. The security system of claim 21 wherein:

said user control interface comprises a receiver;

said indicium comprises a respective transmitter uniquely coded for each of said at least one authorized user; and said activation of said authorization unit comprises activation of said coded transmitter in communication range of said receiver.

24. The security system of claim 23 wherein said receiver and said coded transmitter are wireless.

25. The security system of claim 23 wherein:

said respective transmitter is encoded with multiple codes;

said activation of said authorization unit comprises activation of a selected one of said multiple codes by said one of said at least one authorized user; and said system retrieves a different World Wide Web page based on which of said multiple codes has been selected.

26. The security system of claim 21 wherein:

said user control interface comprises a token reader;

said indicium comprises a respective token uniquely coded for each of said at least one authorized user; and said activation of said authorization unit comprises presentation of said coded token to said reader.

27. The security system of claim 1 wherein:

said system has at least one authorized user, and has an authorization unit for uniquely identifying each of at least one of said authorized users;

one of said at least one authorized user activates said authorization unit using an indicium unique to said one of said at least one authorized user;

said external data network is the Internet; and said activation of said authorization unit logs said one of said at least one authorized user onto the Internet at said user control interface.

28. The security system of claim 1 wherein:

said system has at least one authorized user, and has an authorization unit for uniquely identifying each of at least one of said authorized users;

one of said at least one authorized user enters a security system command at said user control interface by activating said authorization unit using an indicium unique to said one of said at least one authorized user;

said one of said at least one user uses said external data network to access a financial institution to perform a financial transaction;

said indicium is registered with said financial institution as an identifier of said one of said at least one authorized user; and said indicium is sent to said financial institution as part of said financial transaction.

29. The security system of claim 1 wherein functions of said system are remotely accessible via said external data network.

30. The security system of claim 1 wherein:

said system transmits security data signals to a central communication station via said external data network and an alternate channel and awaits acknowledgment thereof; and when said acknowledgment arrives from a first one of said external data network and said alternate channel, said system terminates transmission of said security data on a second one of said external data network and said alternate channel.

31. The security system of claim 30 wherein:

one of said external data network and said alternate channel normally operates faster than another of said external data network and said alternate channel; and said system begins transmission of said security data signals on said one of said external data network and said alternate channel before beginning transmission of said security data signals on said another of said external data network and said alternate channel.

32. The security system of claim 30 further comprising a firewall between said user control interface and said external data network; wherein:

said firewall allows only communication originating at said system and prevents communication originating on said external data network; and to receive said acknowledgment from said central communication station, said system initiates communication with said external data network so that said firewall allows said communication, said initiated communication including a query to said external data network for said acknowledgment to be communicated from said central communication station to said system.

33. The security system of claim 32 wherein said query to said external network comprises a query to said central communication station.

34. The security system of claim 30 wherein said alternate channel is said telephone line.

35. The security system of claim 30 wherein:

said system transmits security data signals to a central communication station via a plurality of channels; and when said acknowledgment arrives from a first one of said plurality of channels, said system terminates transmission of said security data on each other one of said plurality of channels.

36. The security system of claim 35 wherein:

one of said plurality of channels normally operates faster than others of said plurality of channels; and said system begins transmission of said security data signals on said one of said plurality of channels before beginning transmission of said security data signals on said others of said plurality of channels.

37. The security system of claim 1 wherein said system accepts commands from a user via said external data network.

38. The security system of claim 37 further comprising a firewall between said user control interface and said external data network; wherein:

said firewall allows only communication originating at said system and prevents communication originating on said external data network; and to receive said commands from said user, said system initiates communication with said external data network so that said firewall allows said communication, said initiated communication including a query to said external data network for commands issued by said user to be communicated from said external data network to said system.

39. The security system of claim 1 wherein said system sends security data signals to predetermined recipients via said external data network.

40. The security system of claim 1 comprising more than one of said user control interface, each said user control interface functioning as an independent terminal of said external data network.

41. The security system of claim 1 further comprising a firewall between said user control interface and said external data network; wherein:

said firewall allows only communication originating at said system and prevents communication originating on said external data network; and to receive data, said system initiates communication with said external data network so that said firewall allows said communication, said initiated communication including a query to said external data network for data sought to be communicated from said external data network to said system.

42. A security method for monitoring user premises, said method comprising:

providing at least one sensor;

providing at least one alarm output device;

providing at least one user control interface at the user premises;

providing a system controller connected to said sensor, said output device and said user control interface; wherein;

at least one of said at least one user control interface is further connected to an external data network for at least one of (a) sending, and (b) receiving, data; and said at least one user control interface allows a user at the user premises to interact with said system controller and said data.

43. The security method of claim 42 wherein said data comprise electronic mail.

44. The security method of claim 42 wherein:

said at least one user control interface is used by a user to enter commands affecting a state of said system; said method further comprising;

when said state indicates that said system is active, monitoring said at least one sensor and outputting an alarm on said alarm output device when said at least one sensor indicates that an alarm condition exists.

45. The security method of claim 44 wherein:

said data comprise electronic mail; and access to said electronic mail is restricted based on said state of said system.

46. The security method of claim 45 wherein said electronic mail is accessible when said state is consistent with presence of an authorized user on said premises.

47. The security method of claim 46 wherein:

there are a plurality of authorized users, said system having an authorization unit for uniquely identifying each of at least one of said authorized users; and a particular authorized user initiates said state consistent with presence of an authorized user by activating said authorization unit using an indicium unique to said particular authorized user; said method further comprising:

presenting, for access at said user control interface, only electronic mail addressed to said particular authorized user.

48. The security method of claim further comprising:

providing a keypad at said user control interface; wherein:

said indicium comprises a respective passcode unique to each said at least one authorized user; and said activating of said authorization unit comprises entry of said passcode at said keypad.

49. The security method of claim 47 wherein:

said user control interface comprises a receiver; and said indicium comprises a respective transmitter uniquely coded to each of said at least one authorized user; said method further comprising:

activating said authorization unit by activating said coded transmitter in communication range of said receiver.

50. The security method of claim 47 wherein:

said user control interface comprises a token reader; and said indicium comprises a token uniquely coded to each of said at least one authorized user; said method further comprising:

activating said authorization unit by presenting said coded token to said reader.

51. The security method of claim 46 wherein:

said system has a plurality of authorized users, and has an authorization unit for uniquely identifying each of at least one of said authorized users; and a particular authorized user initiates said state consistent with presence of an authorized user by activating said authorization unit using an indicium unique to said particular authorized user; said method further comprising:

presenting access at said user control interface to electronic mail message sending from said particular authorized user.

52. The security method of claim 51 further comprising:

providing a keypad at said user control interface; wherein:

said indicium comprises a respective passcode unique to each of said at least one authorized user; and said activation of said authorization unit indicium comprises entry of said passcode at said keypad.

53. The security method of claim 51 further comprising:

providing a receiver at said user control interface; wherein:

said indicium comprises a respective transmitter uniquely coded to each of said at least one authorized user; and said activation of said authorization unit comprises activation of said coded transmitter in communication range of said receiver.

54. The security method of claim 51 wherein:

said user control interface comprises a token reader; and said indicium comprises a respective token uniquely coded to each of said at least one authorized user; said method further comprising:

activating said authorization unit by presenting said coded token to said reader.

55. The security method of claim 42 wherein:

said data comprise electronic mail; and said system has at least one authorized user, and has an authorization unit for uniquely identifying each of at least one of said authorized users; said method further comprising, when one of said at least one authorized user enters a security system command at said user control interface by activating said authorization unit using an indicium unique to said one of said at least one authorized user;

sending an electronic mail message to a predetermined recipient advising of said entry of said command by said user.

56. The security method of claim 55 further comprising:

providing a keypad at said user control interface; wherein:

said indicium comprises a respective passcode unique to each of said at least one authorized user; and said activation of said authorization unit comprises entry of said passcode at said keypad.

57. The security method of claim 55 wherein:

said user control interface comprises a receiver; and said indicium comprises a respective transmitter uniquely coded for each of said at least one authorized user; said method further comprising:

activating said authorization unit by activating said coded transmitter in communication range of said receiver.

58. The security method of claim 55 wherein:

said user control interface comprises a token reader; and said indicium comprises a token uniquely coded to each of said at least one authorized user; said method further comprising:

activating said authorization unit by presenting said coded token to said reader.

59. The security method of claim 42 wherein:

said external data network is the Internet;

said data comprise World Wide Web pages;

said system has at least one authorized user, and has an authorization unit for uniquely identifying each of at least one of said authorized users; said method further comprising, when one of said at least one authorized user enters a security system command at said user control interface by activating said authorization unit using an indicium unique to said one of said at least one authorized user:

retrieving a World Wide Web page directed to said one of said at least one authorized user and displaying said World Wide Web page at said user control interface.

60. The security method of claim 59 further comprising:

providing a keypad at said user control interface; wherein:

said indicium comprises a respective passcode unique to each of said at least one authorized user; and said activation of said authorization unit comprises entry of said passcode at said keypad.

61. The security method of claim 59 wherein:

said user control interface comprises a receiver; and said indicium comprises a respective transmitter uniquely coded for each of said at least one authorized user; said method further comprising:

activating said authorization unit by activating said coded transmitter in communication range of said receiver.

62. The security method of claim 61 wherein:

said respective transmitter is encoded with multiple codes; and said activation of said authorization unit comprises activation of a selected one of said multiple codes by said one of said at least one authorized user; said method further comprising:

retrieving a different World Wide Web page based on which of said multiple codes has been selected.

63. The security method of claim 59 wherein:

said user control interface comprises a token reader; and said indicium comprises a respective token uniquely coded for each of said at least one authorized user; said method further comprising:

activating said authorization unit by presenting said coded token to said reader.

64. The security method of claim 42 wherein:

said system has at least one authorized user, and has an authorization unit for uniquely identifying each of at least one of said authorized users;

one of said at least one authorized user activates said authorization unit using an indicium unique to said one of said at least one authorized user; and said external data network is the Internet; said method further comprising:

on said activation of said authorization unit, logging said one of said at least one authorized user onto the Internet at said user control interface.

65. The security method of claim 42 wherein:

said system has at least one authorized user, and has an authorization unit for uniquely identifying each of at least one of said authorized users;

one of said at least one authorized user enters a security system command at said user control interface by activating said authorization unit using an indicium unique to said one of said at least one authorized user;

said one of said at least one user uses said external data network to access a financial institution to perform a financial transaction; and said indicium is registered with said financial institution as an identifier of said one of said at least one authorized user; said method further comprising:

sending said indicium to said financial institution as part of said financial transaction.

66. The security method of claim 42 further comprising:

transmitting security data signals to a central communication station via said external data network and an alternate channel and awaiting acknowledgment thereof; and when said acknowledgment arrives from a first one of said external data network and said alternate channel, terminating transmission of said security data on a second one of said external data network and said alternate channel.

67. The security method of claim 66 wherein:

one of said external data network and said alternate channel normally operates faster than another of said external data network and said alternate channel; and transmitting of said security data signals to said central communication station via said one of said external data network and said alternate channel begins before transmitting of said security data signals to said central communication station via said another of said external data network and said alternate channel.

68. The security method of claim 66 wherein:

there is a firewall between said user control interface and said external data network, said firewall allowing only communication originating at said system and preventing communication originating on said external data network; said method further comprising:

to receive said acknowledgment from said central communication station, initiating communication with said external data network so that said firewall allows said communication, said initiated communication including a query to said external data network for said acknowledgment to be communicated from said central communication station to said system.

69. The security method of claim 68 wherein said query to said external network comprises a query to said central communication station.

70. The security method of claim 66 wherein said alternate channel is said telephone line.

71. The security method of claim 42 further comprising:

transmitting security data signals to a central communication station via a plurality of channels; and when said acknowledgment arrives from a first one of said plurality of channels, terminating transmission of said security data on each other one of said plurality of channels.

72. The security method of claim 71 wherein:

one of said plurality of channels normally operates faster than others of said plurality of channels; and transmitting of said security data signals to said central communication station via said one of said plurality of channels begins before transmitting of said security data signals to said central communication station via said others of said plurality of channels.

73. The security method of claim 42 further comprising accepting commands from a user via said external data network.

74. The security method of claim 73 wherein:

there is a firewall between said user control interface and said external data network, said firewall allowing only communication originating at said system and preventing communication originating on said external data network; said method further comprising:

to receive said commands from said user, initiating communication with said external data network so that said firewall allows said communication, said initiated communication including a query to said external data network for commands issued by said user to be communicated from said external data network to said system.

75. The security method of claim 42 further comprising sending security data signals to predetermined recipients via said external data network.

76. The security method of claim 42 wherein:

there is a firewall between said user control interface and said external data network, said firewall allowing only communication originating at said system and preventing communication originating on said external data network; said method further comprising:

to receive data, initiating communication with said external data network so that said firewall allows said communication, said initiated communication including a query to said external data network for data sought to be communicated from said external data network to said system.

77. A security system for monitoring user premises, said system comprising:

at least one means for sensing;

at least one means for outputting an alarm;

at least one user control interface means; and a system controller means connected to said means for sensing, said means for outputting an alarm and said user control interface means; wherein:

at least one of said at least one user control interface means is located at the user premises and is further connected to an external data network for at least one of (a) sending, and (b) receiving, data and wherein said at least one user control interface allows a user at the user premises to interact with said system controller and said data.

78. The security system of claim 77 wherein said data comprise electronic mail.

79. The security system of claim 77 wherein:

said at least one user control interface means is used by a user to enter commands affecting a state of said system; and said system, when said state indicates that said system is active, monitors said at least one means for sensing and outputs an alarm on said means for outputting an alarm when said at least one means for sensing indicates that an alarm condition exists.

80. The security system of claim 79 wherein:

said data comprise electronic mail; and access to said electronic mail is restricted based on said state of said system.

81. The security system of claim 80 wherein said electronic mail is accessible when said state is consistent with presence of an authorized user on said premises.

82. The security system of claim 81 having a plurality of authorized users, and having means for authorizing for uniquely identifying each of at least one of said authorized users, wherein:

a particular authorized user initiates said state consistent with presence of an authorized user by activating said authorization unit using an indicium unique to said particular authorized user; and said user control interface means presents for access at said user control interface means only electronic mail addressed to said particular authorized user.

83. The security system of claim 82 wherein:

said user control interface means comprises keypad means;

said indicium comprises a respective passcode unique to each said at least one authorized user; and said activating of said means for authorizing comprises entry of said passcode at said keypad means.

84. The security system of claim 82 wherein:

said user control interface means comprises means for receiving;

said indicium comprises a respective means for transmitting uniquely coded to each of said at least one authorized user; and said activating of said means for authorizing comprises activation of said coded means for transmitting in communication range of said means for receiving.

85. The security system of claim 84 wherein said means for receiving and said coded means for transmitting are wireless.

86. The security system of claim 82 wherein:

said user control interface means comprises means for reading a token;

said indicium comprises a. token uniquely coded to each of said at least one authorized user; and said activating of said means for authorizing comprises presentation of said coded token to said means for reading.

87. The security system of claim 81 having a plurality of authorized users, and having a means for authorizing f or uniquely identifying each of at least one of said authorized users, wherein:

a particular authorized user initiates said state consistent with presence of an authorized user by activating said means for authorizing using an indicium unique to said particular authorized user; and said user control interface means presents access at said user control interface means to electronic mail message sending from said particular authorized user.

88. The security system of claim 87 wherein:

said user control interface means comprises keypad means;

said indicium comprises a respective passcode unique to each of said at least one authorized user; and said activation of said means for authorizing indicium comprises entry of said passcode at said keypad means.

89. The security system of claim 87 wherein:

said user control interface means comprises means for receiving;

said indicium comprises a respective means for transmitting uniquely coded to each of said at least one authorized user; and said activation of said means for authorizing unit comprises activation of said coded means for transmitting in communication range of said means for receiving.

90. The security system of claim 89 wherein said means for receiving and said coded means for transmitting are wireless.

91. The security system of claim 11 wherein:

said user control interface means comprises means for reading a token;

said indicium comprises a respective token uniquely coded to each of said at least one authorized user; and said activation of said means for authorizing comprises presentation of said coded token to said means for reading.

92. The security system of claim 77 wherein:

said data comprise electronic mail;

said system has at least one authorized user, and has a means for authorizing for uniquely identifying each of at least one of said authorized users; and when one of said at least one authorized user enters a security system command at said user control interface means by activating said means for authorizing using an indicium unique to said one of said at least one authorized user, said user control interface sends an electronic mail message to a predetermined recipient advising of said entry of said command by said user.

93. The security system of claim 92 wherein:

said user control interface means comprises keypad means;

said indicium comprises a respective passcode unique to each of said at least one authorized user; and said activation of said means for authorizing comprises entry of said passcode at said keypad means.

94. The security system of claim 92 wherein:

said user control interface means comprises a means for receiving;

said indicium comprises a respective means for transmitting uniquely coded for each of said at least one authorized user; and said activation of said means for authorizing comprises activation of said coded means for transmitting in communication range of said means for receiving.

95. The security system of claim 94 wherein said means for receiving and said coded means for transmitting are wireless.

96. The security system of claim 92 wherein:

said user control interface means comprises means for reading a token;

said indicium comprises a token uniquely coded to each of said at least one authorized user; and said activation of said means for authorizing comprises presentation of said coded token to said means for reading.

97. The security system of claim 77 wherein:

said external data network is the Internet;

said data comprise World Wide Web pages;

said system has at least one authorized user, and has a means for authorizing for uniquely identifying each of at least one of said authorized users; and when one of said at least one authorized user enters a security system command at said user control interface means by activating said means for authorizing using an indicium unique to said one of said at least one authorized user, said system retrieves a World Wide Web page directed to said one of said at least one authorized user and displays said World Wide Web page at said user control interface.

98. The security system of claim 97 wherein:

said user control interface means comprises keypad means;

said indicium comprises a respective passcode unique to each of said at least one authorized user; and said activation of said means for authorizing comprises entry of said passcode at said keypad means.

99. The security system of claim 97 wherein:

said user control interface means comprises means for receiving;

said indicium comprises a respective means for transmitting uniquely coded for each of said at least one authorized user; and said activation of said means for authorizing comprises activation of said coded means for transmitting in communication range of said means for receiving.

100. The security system of claim 99 wherein said means for receiving and said coded means for transmitting are wireless.

101. The security system of claim 99 wherein:

said respective means for transmitting is encoded with multiple codes;

said activation of said means for authorizing comprises activation of a selected one of said multiple codes by said one of said at least one authorized user; and said system retrieves a different World Wide Web page based on which of said multiple codes has been selected.

102. The security system of claim 97 wherein:

said user control interface means comprises means for reading a token;

said indicium comprises a respective token uniquely coded for each of said at least one authorized user; and said activation of said means for authorizing comprises presentation of said coded token to said means for reading.

103. The security system of claim 77 wherein:

said system has at least one authorized user, and has a means for authorizing for uniquely identifying each of at least one of said authorized users;

one of said at least one authorized user activates said means for authorizing using an indicium unique to said one of said at least one authorized user;

said external data network is the Internet; and said activation of said means for authorizing logs said one of said at least one authorized user onto the Internet at said user control interface means.

104. The security system of claim 77 wherein:

said system has at least one authorized user, and has a means for authorizing for uniquely identifying each of at least one of said authorized users;

one of said at least one authorized user enters a security system command at said user control interface means by activating said means for authorizing using an indicium unique to said one of said at least one authorized user;

said one of said at least one user uses said external data network to access a financial institution to perform a financial transaction;

said indicium is registered with said financial institution as an identifier of said one of said at least one authorized user; and said indicium is sent to said financial institution as part of said financial transaction.

105. The security system of claim 77 wherein functions of said system are remotely accessible via said external data network.

106. The security system of claim 77 wherein:

said system transmits security data signals to a central communication station via said external data network and an alternate channel and awaits acknowledgment thereof; and when said acknowledgment arrives from a first one of said external data network and said alternate channel, said system terminates transmission of said security data on a second one of said external data network and said alternate channel.

107. The security system of claim 106 wherein:

one of said external data network and said alternate channel normally operates faster than another of said external data network and said alternate channel; and said system begins transmission of said security data signals on said one of said external data network and said alternate channel before beginning transmission of said security data signals on said another of said external data network and said alternate channel.

108. The security system of claim 106 further comprising firewall means between said user control interface means and said external data network; wherein:

said firewall means allows only communication originating at said system and prevents communication originating on said external data network; and to receive said acknowledgment from said central communication station, said system initiates communication with said external data network so that said firewall means allows said communication, said initiated communication including a query to said external data network for said acknowledgment to be communicated from said central communication station to said system.

109. The security system of claim 108 wherein said query to said external network comprises a query to said central communication station.

110. The security system of claim 106 wherein said alternate channel is said telephone line.

111. The security system of claim 77 wherein:

said system transmits security data signals to a central communication station via a plurality of channels; and when said acknowledgment arrives from a first one of said plurality of channels, said system terminates transmission of said security data on each other one of said plurality of channels.

112. The security system of claim 111 wherein:

one of said plurality of channels normally operates faster than others of said plurality of channels; and said system begins transmission of said security data signals on said one of said plurality of channels before beginning transmission of said security data signals on said others of said plurality of channels.

113. The security system of claim 77 wherein said system accepts commands from a user via said external data network.

114. The security system of claim 113 further comprising firewall means between said user control interface means and said external data network; wherein:

said firewall means allows only communication originating at said system and prevents communication originating on said external data network; and to receive said commands from said user, said system initiates communication with said external data network so that said firewall means allows said communication, said initiated communication including a query to said external data network for commands issued by said user to be communicated from said external data network to said system.

115. The security system of claim 77 wherein said system sends security data signals to predetermined recipients via said external data network.

116. The security system of claim 77 comprising more than one of said user control interface means, each said user control interface means functioning as an independent terminal of said external data network.

117. The security system of claim 77 further comprising firewall means between said user control interface means and said external data network; wherein:

said firewall means allows only communication originating at said system and prevents communication originating on said external data network; and to receive data, said system initiates communication with said external data network so that said firewall means allows said communication, said initiated communication including a query to said external data network for data sought to be communicated from said external data network to said system.

* * * * *

UNITED STATES PATENT AND TRADEMARK OFFICE

CERTIFICATE OF CORRECTION

PATENT NO. : 6,928,148 B2
DATED : August 9, 2005
INVENTOR(S) : Theodore Simon et al.

It is certified that error appears in the above-identified patent and that said Letters Patent is hereby corrected as shown below:

Drawings,
Sheet 5, Figure 5, in box 502, "SYSYEM" should be -- SYSTEM --.

Column 9,
Line 8, "a" (first occurrence) should be deleted;
Line 40, "all." should be -- call. --.

Column 10,
Line 46, after "may" insert -- be --.

Column 12,
Line 66, "the" (second occurrence) should be deleted.

Column 14,
Line 54, "users" should be -- user --.

Column 22,
Line 19, "until the second" should be deleted;
Line 20, "subscribers unit" should be deleted.

Column 27,
Line 43, "wherein;" should be -- wherein: --;
Line 56, "comprising;" should be -- comprising: --.

UNITED STATES PATENT AND TRADEMARK OFFICE

CERTIFICATE OF CORRECTION

PATENT NO. : 6,928,148 B2
DATED : August 9, 2005
INVENTOR(S) : Theodore Simon et al.

It is certified that error appears in the above-identified patent and that said Letters Patent is hereby corrected as shown below:

Column 28,
Line 14, after "claim" insert -- 47 --.

Column 33,
Line 10, "f or" should be -- for --.

Signed and Sealed this

Twenty-first Day of February, 2006

JON W. DUDAS
*Director of the United States Patent and Trademark Office*

US006928148C1

(12) INTER PARTES REEXAMINATION CERTIFICATE (0351st)

United States Patent

Simon et al.

(10) Number: US 6,928,148 C1

(45) Certificate Issued: Mar. 6, 2012

(54) INTEGRATED SECURITY AND COMMUNICATIONS SYSTEM WITH SECURE COMMUNICATIONS LINK

(75) Inventors: Theodore Simon, Dix Hills, NY (US); Steven Winick, Woodmere, NY (US); Scott H. Simon, Huntington, NY (US); Christopher E. Beach, Amityville, NY (US)

(73) Assignee: Honeywell International Inc., Morristown, NJ (US)

Reexamination Request:
No. 95/001,315, May 13, 2010

Reexamination Certificate for:

Patent No.: 6,928,148
Issued: Aug. 9, 2005
Appl. No.: 09/805,864
Filed: Mar. 13, 2001

Certificate of Correction issued Feb. 21, 2006.

Related U.S. Application Data

(60) Provisional application No. 60/188,798, filed on Mar. 13, 2000.

(51) Int. Cl.
*H04M 11/00* (2006.01)
*H04M 11/04* (2006.01)

(52) U.S. Cl. .................... 379/39; 379/90.01; 379/93.24; 379/93.02

(58) Field of Classification Search ........................ None
See application file for complete search history.

(56) References Cited

To view the complete listing of prior art documents cited during the proceeding for Reexamination Control Number 95/001,315, please refer to the USPTO's public Patent Application Information Retrieval (PAIR) system under the Display References tab.

*Primary Examiner*—Christina Y Leung

(57) ABSTRACT

An integrated security and communications system combines a security system to either or both of a telephone system interface and a data interface. Users have access to voice-mail or other PBX-type telephone functions, many or all of which can be accessed not only at telephone sets, but also at keypads of the security system. Data functions such as electronic mail and possible partial or full World Wide Web access may also be provided at the keypads, as well as at connected personal computers or computer terminals. The system keypads may be enhanced to better accommodate some of the added functions. A central communications station could be used to maintain secure, shared private key encrypted communications with each premises system, using a redirector arrangement or relay to allow each premises system to communicate securely with a central monitoring station and with other systems. The secure communications system could be used without a security system to allow secure computer-to-computer communications.

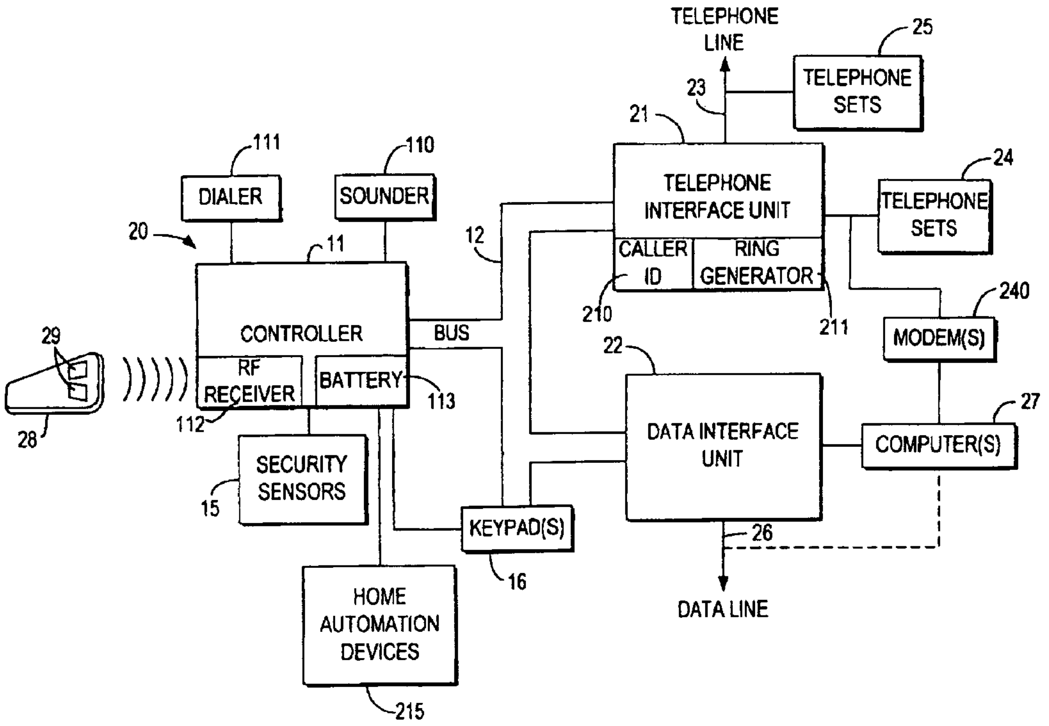

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 30, 42, 45, 66, 77, 80 and 106 are determined to be patentable as amended.

Claims 2, 3, 5-29, 31-41, 43, 44, 46-65, 67-76, 78, 79, 81-105 and 107-117, dependent on an amended claim, are determined to be patentable.

New claims 118-170 are added and determined to be patentable.

1. A security system for monitoring user premises, said system comprising:

at least one sensor;

at least one alarm output device;

at least one user control interface; and a system controller connected to said sensor, said output device and said user control interface; wherein:

at least one of said at least one user control interface is located at the user premises and is further *directly* connected to an external data network for at least one of (a) sending, and (b) receiving, data; and said at least one user control interface allows a user at the user premises to interact with said system controller and said data.

4. [The security system of claim 3 wherein:] *A security system for monitoring user premises, said system comprising:*

*at least one sensor;*

*at least one alarm output device;*

*at least one user control interface; and*

*a system controller connected to said sensor, said output device and said user control interface; wherein:*

*at least one of said at least one user control interface is located at the user premises and is further connected to an external data network for at least one of (a) sending, and (b) receiving, data; and*

*said at least one user control interface allows a user at the user premises to interact with said system controller and said data;*

*wherein said at least one user control interface is used by a user to enter commands affecting a state of said system;*

*wherein said system, when said state indicates that said system is active, monitors said at least one sensor and outputs an alarm on said alarm output device when said at least one sensor indicates that an alarm condition exists;*

*wherein* said data comprise electronic mail; and

*wherein* access to said electronic mail is restricted based on said state of said system.

30. [The security system of claim 1] *A security system for monitoring user premises, said system comprising:*

*at least one sensor;*

*at least one alarm output device;*

*at least one user control interface; and*

*a system controller connected to said sensor, said output device and said user control interface; wherein:*

*at least one of said at least one user control interface is located at the user premises and is further connected to an external data network for at least one of (a) sending, and (b) receiving, data; and*

*said at least one user control interface allows a user at the user premises to interact with said system controller and said data;* wherein[:] said system transmits security data signals to a central communication station via said external data network and an alternate channel and awaits acknowledgment thereof; and

*wherein* when said acknowledgment arrives from a first one of said external data network and said alternate channel, said system terminates transmission of said security data on a second one of said external data network and said alternate channel.

42. A security method for monitoring user premises, said method comprising:

providing at least one sensor;

providing at least one alarm output device;

providing at least one user control interface at the user premises;

providing a system controller connected to said sensor, said output device and said user control interface; wherein:

at least one of said at least one user control interface is further *directly* connected to an external data network for at least one of (a) sending, and (b) receiving, data; and said at least one user control interface allows a user at the user premises to interact with said system controller and said data.

45. [The security method of claim 44] *A security method for monitoring user premises, said method comprising:*

*providing at least one sensor;*

*providing at least one alarm output device;*

*providing at least one user control interface at the user premises;*

*providing a system controller connected to said sensor, said output device and said user control interface; wherein;*

*at least one of said at least one user control interface is further connected to an external data network for at least one of (a) sending, and (b) receiving, data; and*

*said at least one user control interface allows a user at the user premises to interact with said system controller and said data;*

*wherein said at least one user control interface is used by a user to enter commands affecting a state of said system;*

*said method further comprising:*

*when said state indicates that said system is active, monitoring said at least one sensor and outputting an alarm on said alarm output device when said at least one sensor indicates that an alarm condition exists;* wherein[:] said data comprise electronic mail; and

*wherein* access to said electronic mail is restricted based on said state of said system.

66. [The security method of claim 42 further comprising:] *A security method for monitoring user premises, said method comprising:*

*providing at least one sensor;*

*providing at least one alarm output device;*

*providing at least one user control interface at the user premises;*

*providing a system controller connected to said sensor, said output device and said user control interface; wherein;*

*at least one of said at least one user control interface is further connected to an external data network for at least one of (a) sending, and (b) receiving, data; and*

*said at least one user control interface allows a user at the user premises to interact with said system controller and said data;*

*the method further comprising:* transmitting security data signals to a central communication station via said external data network and an alternate channel and awaiting acknowledgment thereof; and when said acknowledgment arrives from a first one of said external data network and said alternate channel, terminating transmission of said security data on a second one of said external data network and said alternate channel.

77. A security system for monitoring user premises, said system comprising:

at least one means for sensing;

at least one means for outputting an alarm;

at least one user control interface means; and a system controller means connected to said means for sensing, said means for outputting an alarm and said user control interface means; wherein:

at least one of said at least one user control interface means is located at the user premises and is further *directly* connected to an external data network for at least one of (a) sending, and (b) receiving, data and wherein said at least one user control interface allows a user at the user premises to interact with said system controller and said data.

80. [The security system of claim 79] *A security system for monitoring user premises, said system comprising:*

*at least one means for sensing;*

*at least one means for outputting an alarm;*

*at least one user control interface means; and*

*a system controller means connected to said means for sensing, said means for outputting an alarm and said user control interface means;*

*wherein at least one of said at least one user control interface means is located at the user premises and is further connected to an external data network for at least one of (a) sending, and (b) receiving, data and wherein said at least one user control interface allows a user at the user premises to interact with said system controller and said data;*

*wherein said at least one user control interface means is used by a user to enter commands affecting a state of said system;*

*wherein said system, when said state indicates that said system is active, monitors said at least one means for sensing and outputs an alarm on said means for outputting an alarm when said at least one means for sensing indicates that an alarm condition exists;* wherein[:] said data comprise electronic mail; and

*wherein* access to said electronic mail is restricted based on said state of said system.

106. [The security system of claim 77] *A security system for monitoring user premises, said system comprising:*

*at least one means for sensing;*

*at least one means for outputting an alarm;*

*at least one user control interface means; and*

*a system controller means connected to said means for sensing, said means for outputting an alarm and said user control interface means; wherein:*

*at least one of said at least one user control interface means is located at the user premises and is further connected to an external data network for at least one of (a) sending, and (b) receiving, data and wherein said at least one user control interface allows a user at the user premises to interact with said system controller and said data;* wherein[:] said system transmits security data signals to a central communication station via said external data network and an alternate channel and awaits acknowledgment thereof; and

*wherein* when said acknowledgment arrives from a first one of said external data network and said alternate channel, said system terminates transmission of said security data on a second one of said external data network and said alternate channel.

*118. A security system for monitoring user premises, said system comprising:*

*at least one sensor;*

*at least one alarm output device;*

*at least one user control interface; and*

*a system controller connected to said sensor, said output device and said user control interface; wherein:*

*at least one of said at least one user control interface is located at the user premises and is further connected to an external data network for at least one of (a) sending, and (b) receiving, data;*

*said at least one user control interface allows a user at the user premises to interact with said system controller and said data; and*

*said system transmits security data signals to a central communication station via said external data network and an alternate channel initiated at the same time, and awaits acknowledgment thereof.*

*119. The security system of claim 118 wherein said data comprise electronic mail.*

*120. The security system of claim 118 wherein said at least one user control interface is used by a user to enter commands affecting a state of said system; and*

*said system, when said state indicates that said system is active, monitors said at least one sensor and outputs an alarm on said alarm output device when said at least one sensor indicates that an alarm condition exists.*

*121. The security system of claim 118 wherein functions of said system are remotely accessible via said external data network.*

*122. The security system of claim 118 wherein said system accepts commands from a user via said external data network.*

*123. The security system of claim 122 further comprising a firewall between said user control interface and said external data network;*

*wherein: said firewall allows only communication originating at said system and prevents communication originating on said external data network; and*

*to receive said commands from said user, said system initiates communication with said external data network*

*so that said firewall allows said communication, said initiated communication including a query to said external data network for commands issued by said user to be communicated from said external data network to said system.*

*124. The security system of claim 118 wherein said system sends security data signals to predetermined recipients via said external data network.*

*125. The security system of claim 118 comprising more than one of said user control interface, each said user control interface functioning as an independent terminal of said external data network.*

*126. The security system of claim 118 further comprising a firewall between said user control interface and said external data network; wherein:*

*said firewall allows only communication originating at said system and prevents communication originating on said external data network; and*

*to receive data, said system initiates communication with said external data network so that said firewall allows said communication, said initiated communication including a query to said external data network for data sought to be communicated from said external data network to said system.*

*127. A security method for monitoring user premises, said method comprising:*

*providing at least one sensor;*

*providing at least one alarm output device;*

*providing at least one user control interface at the user premises;*

*providing a system controller connected to said sensor, said output device and said user control interface; wherein:*

*at least one of said at least one user control interface is further connected to an external data network for at least one of (a) sending, and (b) receiving, data; and*

*said at least one user control interface allows a user at the user premises to interact with said system controller and said data;*

*the method further comprising:*

*transmitting security data signals to a central communication station via said external data network and an alternate channel initiated at the same time, and awaiting acknowledgment thereof.*

*128. The security method of claim 127 wherein said data comprise electronic mail.*

*129. The security method of claim 127 wherein:*

*said at least one user control interface is used by a user to enter commands affecting a state of said system;*

*said method further comprising: when said state indicates that said system is active, monitoring said at least one sensor and outputting an alarm on said alarm output device when said at least one sensor indicates that an alarm condition exists.*

*130. The security method of claim 127 further comprising accepting commands from a user via said external data network.*

*131. The security method of claim 130 wherein:*

*there is a firewall between said user control interface and said external data network, said firewall allowing only communication originating at said system and preventing communication originating on said external data network;*

*said method further comprising: to receive said commands from said user, initiating communication with said external data network so that said firewall allows said communication, said initiated communication including a query to said external data network for commands issued by said user to be communicated from said external data network to said system.*

*132. The security method of claim 127 further comprising sending security data signals to predetermined recipients via said external data network.*

*133. The security method of claim 127 wherein:*

*there is a firewall between said user control interface and said external data network, said firewall allowing only communication originating at said system and preventing communication originating on said external data network;*

*said method further comprising: to receive data, initiating communication with said external data network so that said firewall allows said communication, said initiated communication including a query to said external data network for data sought to be communicated from said external data network to said system.*

*134. A security system for monitoring user premises, said system comprising:*

*at least one means for sensing;*

*at least one means for outputting an alarm;*

*at least one user control interface means; and*

*a system controller means connected to said means for sensing, said means for outputting an alarm and said user control interface means;*

*wherein:*

*at least one of said at least one user control interface means is located at the user premises and is further connected to an external data network for at least one of (a) sending, and (b) receiving, data;*

*said at least one user control interface allows a user at the user premises to interact with said system controller and said data;*

*said system transmits security data signals to a central communication station via said external data network and an alternate channel initiated at the same time, and awaits acknowledgment thereof.*

*135. The security system of claim 134 wherein said data comprise electronic mail.*

*136. The security system of claim 134 wherein:*

*said at least one user control interface means is used by a user to enter commands affecting a state of said system; and*

*said system, when said state indicates that said system is active, monitors said at least one means for sensing and outputs an alarm on said means for outputting an alarm when said at least one means for sensing indicates that an alarm condition exists.*

*137. The security system of claim 134 wherein functions of said system are remotely accessible via said external data network.*

*138. The security system of claim 134 wherein said system accepts commands from a user via said external data network.*

*139. The security system of claim 138 further comprising firewall means between said user control interface means and said external data network;*

*wherein:*

*said firewall means allows only communication originating at said system and prevents communication originating on said external data network; and*

*to receive said commands from said user, said system initiates communication with said external data network*

*so that said firewall means allows said communication, said initiated communication including a query to said external data network for commands issued by said user to be communicated from said external data network to said system.*

*140. The security system of claim 134 wherein said system sends security data signals to predetermined recipients via said external data network.*

*141. The security system of claim 134 comprising more than one of said user control interface means, each said user control interface means functioning as an independent terminal of said external data network.*

*142. The security system of claim 134 further comprising firewall means between said user control interface means and said external data network;*

*wherein:*

*said firewall means allows only communication originating at said system and prevents communication originating on said external data network; and*

*to receive data, said system initiates communication with said external data network so that said firewall means allows said communication, said initiated communication including a query to said external data network for data sought to be communicated from said external data network to said system.*

*143. A security system for monitoring user premises, said system comprising:*

*at least one sensor;*

*at least one alarm output device;*

*at least one user control interface; and*

*a system controller connected to said sensor, said output device and said user control interface; wherein:*

*at least one of said at least one user control interface is located at the user premises and is further connected to an external data network for at least one of (a) sending, and (b) receiving, data;*

*said at least one user control interface allows a user at the user premises to interact with said system controller and said data;*

*said at least one user control interface is used by a user to enter commands affecting a state of said system; and*

*access to said data is restricted based on said state of said system.*

*144. The security system of claim 143 wherein said data comprise electronic mail.*

*145. The security system of claim 143, wherein said system, when said state indicates that said system is active, monitors said at least one sensor and outputs an alarm on said alarm output device when said at least one sensor indicates that an alarm condition exists.*

*146. The security system of claim 143 wherein functions of said system are remotely accessible via said external data network.*

*147. The security system of claim 143 wherein said system accepts commands from a user via said external data network.*

*148. The security system of claim 147 further comprising a firewall between said user control interface and said external data network;*

*wherein: said firewall allows only communication originating at said system and prevents communication originating on said external data network; and*

*to receive said commands from said user, said system initiates communication with said external data network so that said firewall allows said communication, said initiated communication including a query to said external data network for commands issued by said user to be communicated from said external data network to said system.*

*149. The security system of claim 143 wherein said system sends security data signals to predetermined recipients via said external data network.*

*150. The security system of claim 143 comprising more than one of said user control interface, each said user control interface functioning as an independent terminal of said external data network.*

*151. The security system of claim 143 further comprising a firewall between said user control interface and said external data network; wherein:*

*said firewall allows only communication originating at said system and prevents communication originating on said external data network; and*

*to receive data, said system initiates communication with said external data network so that said firewall allows said communication, said initiated communication including a query to said external data network for data sought to be communicated from said external data network to said system.*

*152. A security method for monitoring user premises, said method comprising:*

*providing at least one sensor;*

*providing at least one alarm output device;*

*providing at least one user control interface at the user premises;*

*providing a system controller connected to said sensor, said output device and said user control interface; wherein:*

*at least one of said at least one user control interface is further connected to an external data network for at least one of (a) sending, and (b) receiving, data;*

*said at least one user control interface allows a user at the user premises to interact with said system controller and said data;*

*said at least one user control interface is used by a user to enter commands affecting a state of said system; and*

*access to said data is restricted based on said state of said system.*

*153. The security method of claim 152 wherein said data comprise electronic mail.*

*154. The security method of claim 152 said method further comprising:*

*when said state indicates that said system is active, monitoring said at least one sensor and outputting an alarm on said alarm output device when said at least one sensor indicates that an alarm condition exists.*

*155. The security method of claim 152 further comprising accepting commands from a user via said external data network.*

*156. The security method of claim 155 wherein:*

*there is a firewall between said user control interface and said external data network, said firewall allowing only communication originating at said system and preventing communication originating on said external data network;*

*said method further comprising: to receive said commands from said user, initiating communication with said external data network so that said firewall allows said communication, said initiated communication including a query to said external data network for commands issued by said user to be communicated from said external data network to said system.*

*157. The security method of claim 152 further comprising sending security data signals to predetermined recipients via said external data network.*

*158. The security method of claim 152 wherein:*

*there is a firewall between said user control interface and said external data network, said firewall allowing only communication originating at said system and preventing communication originating on said external data network;*

*said method further comprising: to receive data, initiating communication with said external data network so that said firewall allows said communication, said initiated communication including a query to said external data network for data sought to be communicated from said external data network to said system.*

*159. A security system for monitoring user premises, said system comprising:*

*at least one means for sensing;*

*at least one means for outputting an alarm;*

*at least one user control interface means; and*

*a system controller means connected to said means for sensing, said means for outputting an alarm and said user control interface means;*

*wherein:*

*at least one of said at least one user control interface means is located at the user premises and is further connected to an external data network for at least one of (a) sending, and (b) receiving, data;*

*said at least one user control interface is used by a user to interact with said system controller and said data;*

*said at least one user control interface means is used by a user to enter commands affecting a state of said system; and*

*access to said data is restricted based on said state of said system.*

*160. The security system of claim 159 wherein said data comprise electronic mail.*

*161. The security system of claim 159 wherein said system, when said state indicates that said system is active, monitors said at least one means for sensing and outputs an alarm on said means for outputting an alarm when said at least one means for sensing indicates that an alarm condition exists.*

*162. The security system of claim 159 wherein functions of said system are remotely accessible via said external data network.*

*163. The security system of claim 159 wherein said system accepts commands from a user via said external data network.*

*164. The security system of claim 163 further comprising firewall means between said user control interface means and said external data network;*

*wherein:*

*said firewall means allows only communication originating at said system and prevents communication originating on said external data network; and*

*to receive said commands from said user, said system initiates communication with said external data network so that said firewall means allows said communication, said initiated communication including a query to said external data network for commands issued by said user to be communicated from said external data network to said system.*

*165. The security system of claim 159 wherein said system sends security data signals to predetermined recipients via said external data network.*

*166. The security system of claim 159 comprising more than one of said user control interface means, each said user control interface means functioning as an independent terminal of said external data network.*

*167. The security system of claim 159 further comprising firewall means between said user control interface means and said external data network;*

*wherein:*

*said firewall means allows only communication originating at said system and prevents communication originating on said external data network; and*

*to receive data, said system initiates communication with said external data network so that said firewall means allows said communication, said initiated communication including a query to said external data network for data sought to be communicated from said external data network to said system.*

*168. The security system of claim 143, wherein said data comprises non-security data.*

*169. The security method of claim 152, wherein said data comprises non-security data.*

*170. The security system of claim 159, wherein said data comprises non-security data.*

* * * * *